United States Patent [19]

Wachsmuth et al.

[11] Patent Number: 4,710,128
[45] Date of Patent: Dec. 1, 1987

[54] SPATIAL DISORIENTATION TRAINER-FLIGHT SIMULATOR

[75] Inventors: Robert H. Wachsmuth, Elkins Park; Donald W. Brusch, Newtown, both of Pa.

[73] Assignee: Environmental Tectonics Corporation, Southampton, Pa.

[21] Appl. No.: 664,807

[22] Filed: Oct. 25, 1984

[51] Int. Cl.$^4$ ............................................... G09B 9/08
[52] U.S. Cl. ....................................... 434/46; 434/59; 434/55; 434/30
[58] Field of Search ...................... 434/30, 35, 45, 46, 434/49, 51, 55, 57, 59; 272/15-18

[56] References Cited

U.S. PATENT DOCUMENTS

| Re. 27,051 | 2/1971 | Cappel | 434/58 |
|---|---|---|---|
| 2,687,580 | 8/1954 | Dehmel | 434/59 |
| 2,930,144 | 3/1960 | Fogarty | 434/58 |
| 3,196,557 | 7/1965 | Davidson et al. | 272/17 |
| 3,221,419 | 12/1965 | Cohen | 434/34 |
| 3,281,962 | 11/1966 | Pancoe | 434/58 |
| 3,340,619 | 9/1967 | Bertin | 434/59 |
| 3,436,841 | 4/1969 | Whitmore et al. | 434/34 |
| 3,829,988 | 8/1974 | Burny | 434/58 |
| 4,280,285 | 7/1981 | Haas | 434/30 |

OTHER PUBLICATIONS

Gillingham, K. et al, "Design Criteria for the Spatial Orientation Trainer" (USAF School of Aerospace Medicine—Jul. 6, 1967) at pp. 5-10.

Gillingham, K., "Advanced Spatial Disorientation Training Concept", Aeromedical Review (USAF School of Aerospace Medicine—Dec. 1974) at pp. 5-17.

Primary Examiner—Leo P. Picard
Attorney, Agent, or Firm—Seidel, Gonda, Goldhammer & Abbott

[57] ABSTRACT

Spatial disorientation trainer-flight simulator wherein a cockpit is gimballed on three independently-controlled axes, i.e., pitch, roll and yaw, which revolve about a planetary axis. Rotation of the cockpit about the planetary axis is controlled by a remote console computer. Rotation of the cockpit about the pitch and roll axes is controlled by an on board cockpit computer alone or in combination with the console computer. Rotation of the cockpit about the yaw axis is controlled by the console computer alone or in combination with the cockpit computer. Slip rings are employed at the planetary and yaw axes so as to provide 360° cockpit rotation about each axis. Rotation about each of the pitch, roll and yaw axes is effected by a high torque direct drive dc motor under control of the computers. Smooth, continuous motor operation is possible over a wide range of speeds, including sub-threshold speeds not detectable by the pilot.

32 Claims, 29 Drawing Figures

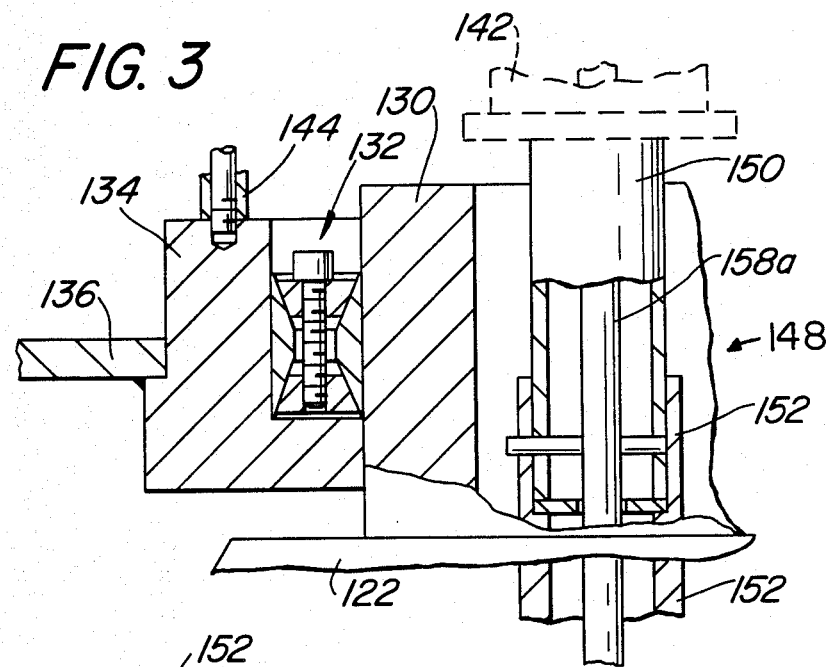
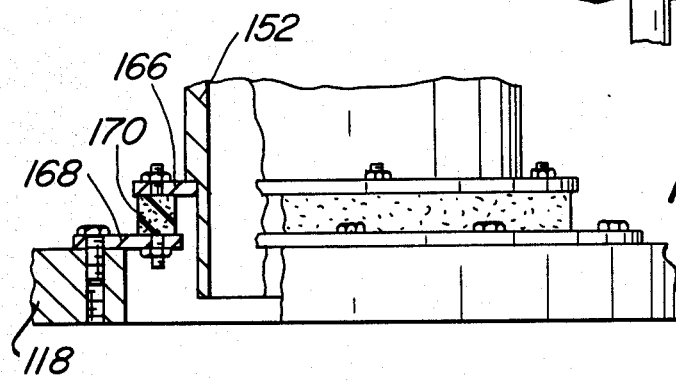
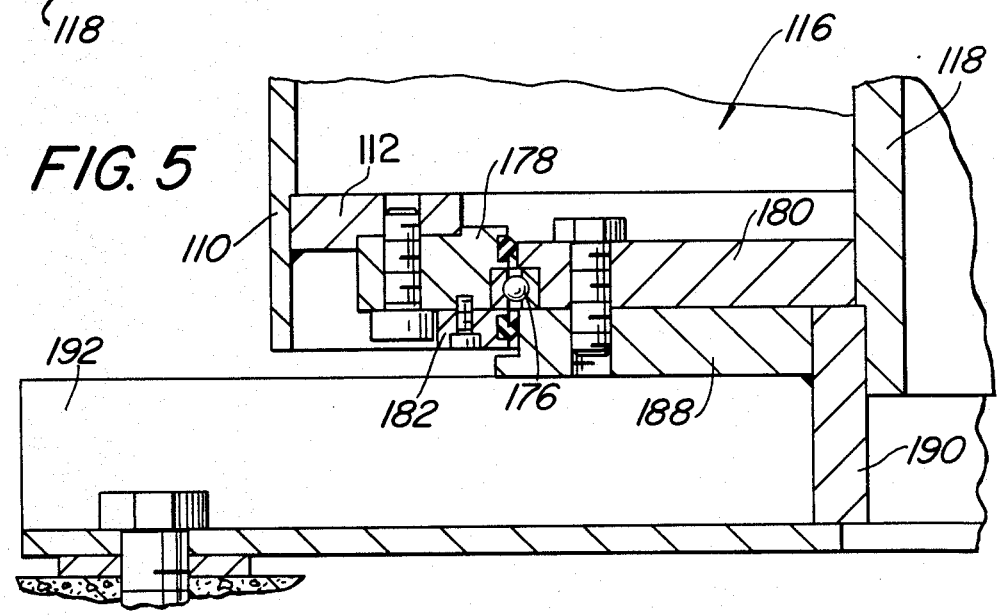

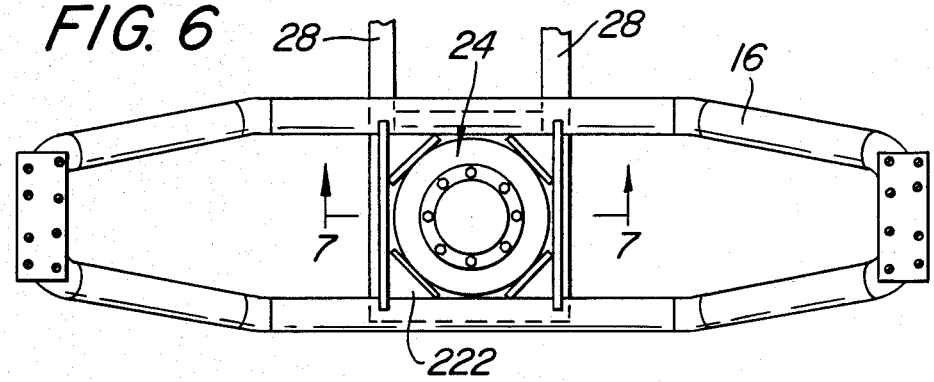
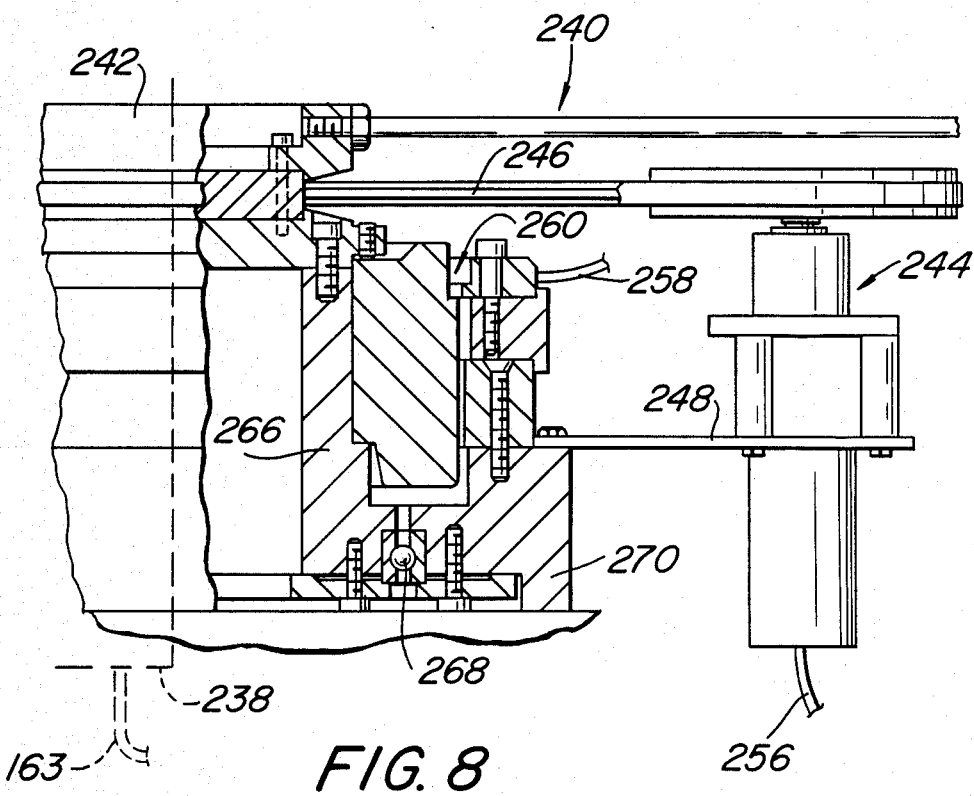

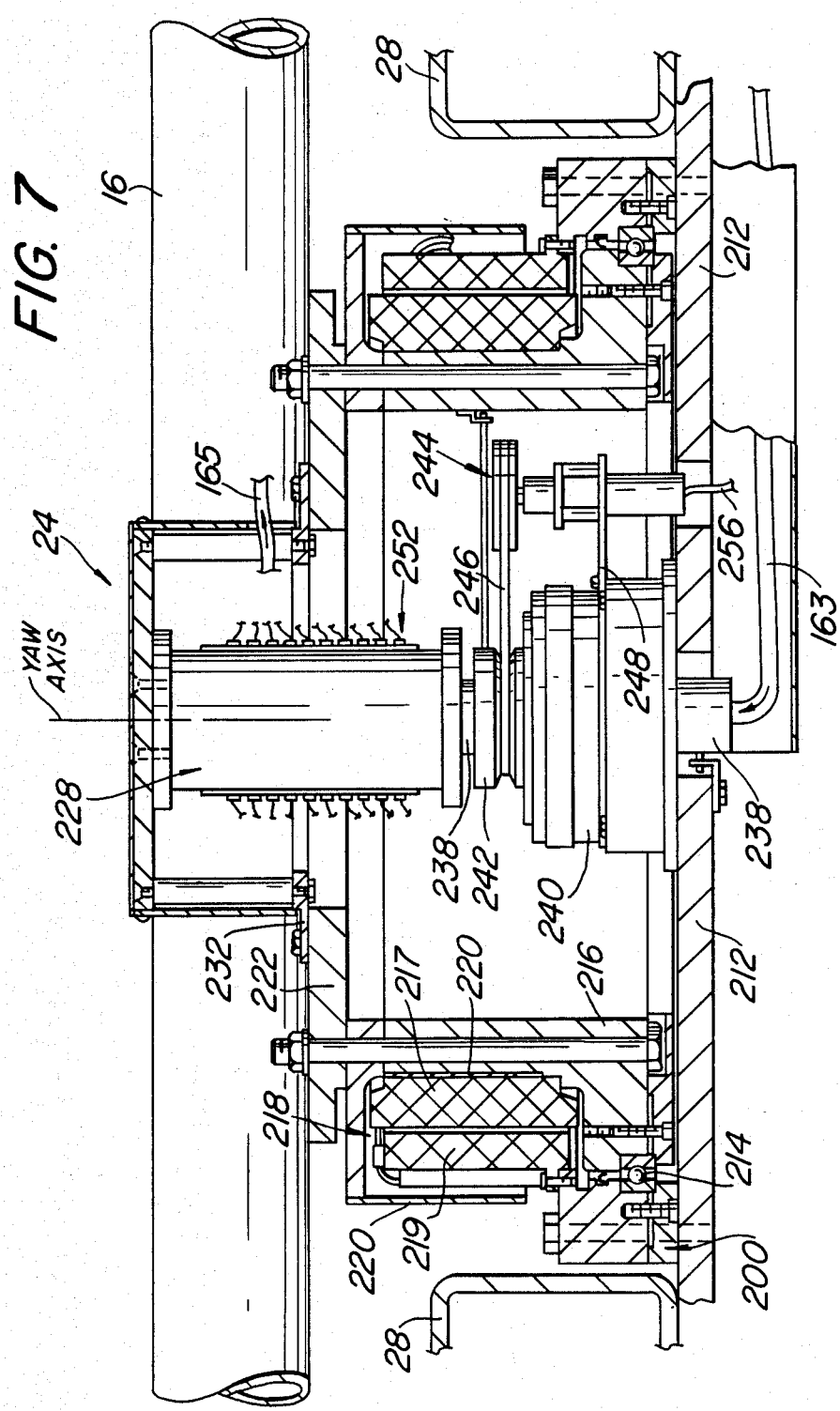

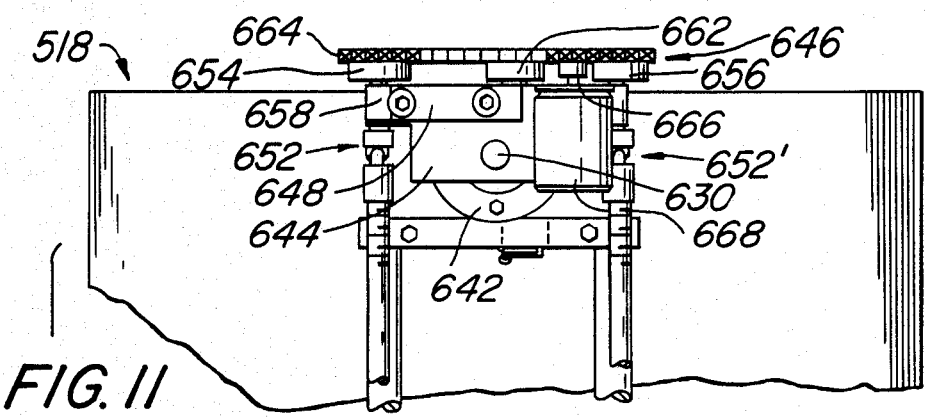
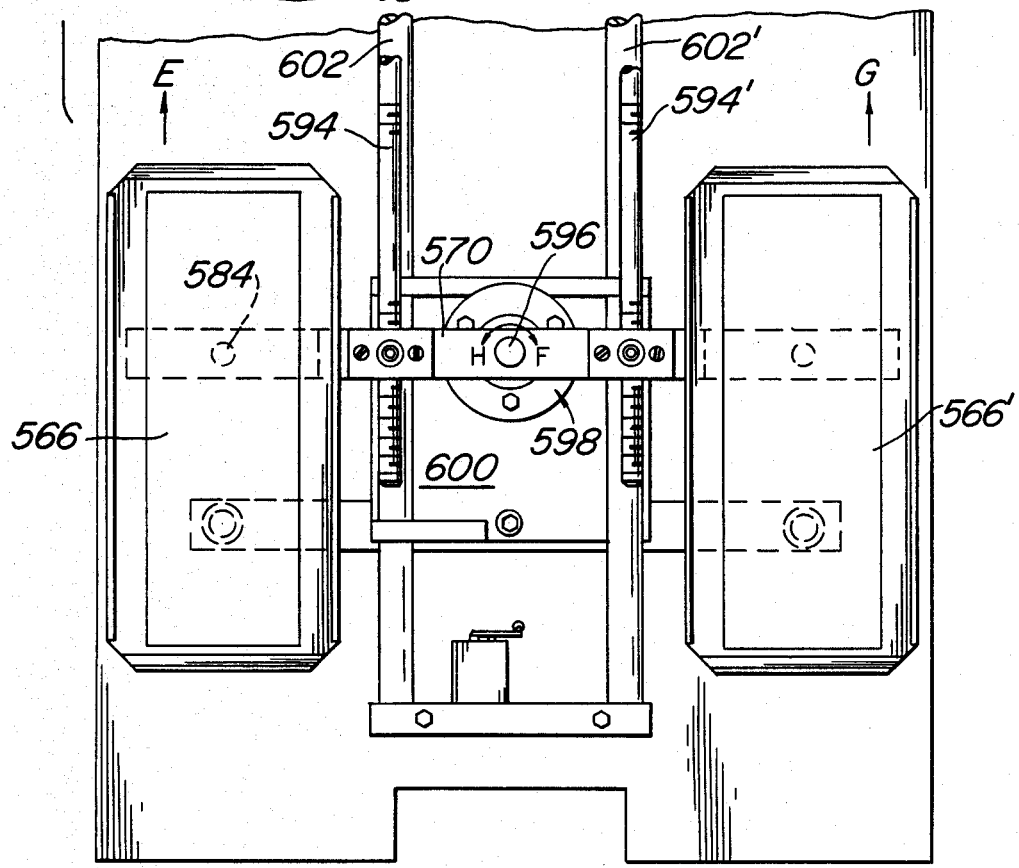
FIG. 11

SPATIAL DISORIENTATION TRAINER-FLIGHT SIMULATOR

BACKGROUND OF THE INVENTION

The invention is directed to a spatial disorientation trainer-flight simulator wherein a cockpit is gimballed on three independently controlled axes at the end of an arm coupled to a planetary hub. The hub is capable of rotating so as to exert centripetal forces in the order of 2g's on the pilot. Each of the gimbal axes is separately controlled by high torque direct drive motors so as to obtain smooth, continuous changes in speed from a sub-threshold speed range (0.5°/sec-5°/sec) to speeds of 200°/sec.

The invention simulates various spatial disorientation effects experienced in high performance jet aircraft, including somatogyral and somatogravic illusions, the Coriolis effect, "the leans" and other disorienting effects. The somatogyral and somatogravic illusions can be sustained indefinitely. The invention comprises a dynamic computer controlled system which can include the pilot. Vestibular illusions are produced by computer control of the gimbal and planetary axes. The conditions may be changed instantaneously by an operator, by the pilot or by stored program. Flight instruments are controlled to indicate the simulated flight conditions. The pilot is able to control the gimbal axes so as to "fly out" of various disorienting effects.

Various spatial disorientation devices and flight simulators are known in the art. For example, U.S. Pat. No. 3,436,841 discloses a portable spatial disorientation device which can be used as a trainer. The device includes a cockpit rotatable about a planetary hub. The cockpit is connected by a frame to the hub. The frame is mounted on rollers which travel on a circular track. The frame supports a motor which is coupled by a chain drive to one of the wheels so as to initiate planetary motion about the hub. The cockpit is mounted on a platform rotatable 360° in yaw, from 0-10 rpm (60°/sec). The platform can be rolled hydraulicly to a fixed position, plus or minus 15° about the roll axis. The roll position must be held during yaw rotation and during planetary rotation.

The cockpit is provided with a throttle, joy stick and yaw pedals. An attitude indicator is provided in the forward part of the cockpit. The cockpit motion is controlled by an operator, not the pilot. The pilot's responses (in operating the throttle, joy stick and pedals) are merely recorded. The hub is provided with slip rings to make one-way power connections to the cockpit motors. There is no bidirectional data communication through the slip rings.

U.S. Pat. No. 3,281,962 discloses an hydraulicly powered flight simulator. A single hydraulic actuator is employed for vertical translation; another for roll; another for yaw; and two more for pitch. A cylinder connected between the cockpit and a pitch frame provides the roll motion. A yaw guide or track (mounted on the front of the pitch frame) and a hydraulic actuator provide yaw motion. Pitch motion is provided by a pair of actuators coupled between an acceleration frame and the pitch frame. The actuators are controlled by a programmed computer. Apparently, the pilot is not incorporated in the control loop, i.e., the pilot cannot control the cockpit motion.

U.S. Pat. No. 2,930,144 discloses a flight trainer which is operated based on perceptible impulses of motion. A pitch motor is geared to a splined pitch shaft journaled in an outer gimbal frame. An inner gimbal frame is provided with a splined hug which meshes with the pitch shaft. A cylinder is provided to laterally displace the inner frame over short distances. The cockpit is mounted on a splined roll shaft journaled in the inner gimbal frame. The roll shaft is gear coupled to and driven by a motor. A cylinder is also connected between the inner gimbal frame and cockpit to displace the cockpit fore/aft over short distances. Slip rings and flexible cabling may be employed to connect the cockpit motors. Apparently, the pilot is not incorporated in the control loop.

U.S. Pat. No. 3,196,557 discloses a centrifuge mounted motion simulator. A central concrete pylon pivotably supports one end of a truss type centrifuge arm. An elevator tower is coupled to the other end of the arm. The tower includes trolly wheels which ride on a circular railroad track. A vertically displaceable elevator cage is mounted on the tower. The cockpit is gimballed on the cage. The centrifuge arm is driven by an endless cable entrained on the circular track and wound on motor driven drums at the pylon. The yaw frame is gimballed on the cage and rotated by a motor which is coupled to the frame by means of a chain drive. The pitch frame is gimballed to the yaw frame and is rotated by a chain drive coupled to the yaw frame. The cockpit is gimballed on the pitch frame for roll movement by a motor which is mounted on the pitch frame and chain coupled to the cockpit. The motors are operated by a programmed computer. Apparently, the pilot is not in the control loop.

U.S. Pat. Nos. Re. 27,051 and 2,687,580 disclose devices wherein the pilot exercises control over capsule motion, but in response to disorientation effects produced by computer generated signals. Patent Re. 27,051 discloses a linear actuator dynamic acceleration simulator. The device provides movement in six degrees of freedom, three linear and three rotational (pitch, roll and yaw). The device comprises an hexagonal shaped platform supported by six linear actuators which extend between the platform and the base. The actuators are hydraulicly extended or retracted separately or in combination so as to provide movement in the various degrees of freedom. The actuators are coupled by a mechanical analog conversion system including a mechanical model and mechanical-to-electrical transducers. The system is driven by a computer in response to pilot signals from the capsule.

U.S. Pat. No. 2,687,580 discloses a flight trainer and simulator. The simulator includes a cockpit which is gimballed for pitch and roll only. Servo systems compute the pitch and roll angles for simulating the desired effect in response to pilot control. The servo systems determine air speed, yaw rate, yaw, pitch rate, pitch, angle of attack and side-slip. The pitch movement is actuated by a rotary transformer coupled by a gear reduction to a servo motor, and the pitch of the cockpit is varied by mechanical connection between the servo motor shaft and the cockpit pitch axis. The roll of the cockpit is similarly controlled.

U.S. Pat. No. 3,829,988 is directed to a flight simulator wherein a cockpit is mounted for pitch and roll movement only. There is no yaw motion. The pilot is not incorporated in a control loop.

U.S. Pat. No. 3,340,619 discloses a pilot testing apparatus wherein a rectangular nacelle mounted on a telescopic arm is guided along a cushioned elliptical track. The nacelle includes a gimballed cockpit. An electric motor is coupled by worm gears to the gimbal frames to initiate rotation with respect to any of the three gimbal axes.

U.S. Pat. No. 3,221,419 discloss a flight simulator which simulates true linear acceleration, accounting for the Coriolis effect. The gimbal frames are rotated by two motors.

A concise summary of the various disorienting effects and illusions experienced during flight is contained in Gillingham, K. et. al., "Design Criteria For The Spatial Orientation Trainer" (USAF School of Aerospace Medicine July 6, 1967) at pages 5-10 and Gillingham, K., "Advanced Spatial Disorientation Training Concepts", *Aeromedical Review* (USAF School of Aerospace Medicine December 1974) at pages 5-17, incorporated herein by reference. A U.S. Air Force spatial orientation trainer is described therein as permitting responsive control by the pilot to oculographic, Coriolos and oculogyral effects.

*Aviation Week & Technology* (Sept. 15, 1975) discloses an inertial guidance motion simulator which uses direct drive, high torque dc motors to simulate three axes of guidance system flight motion.

An object of the present invention is to provide a spatial disorientation trainer and flight simulator wherein the pilot is "in the loop".

Another object of the invention is to provide a spatial disorientation trainer wherein the pilot is subjected to a centripetal force as high as 2g's so as to enable the pilot to practice the "L1" or "M1" breathing maneuver.

Another object of the invention is to provide unlimited yaw motion at speeds as high as 200°/sec so as to simulate the "flat spin" effect of a jet aircraft.

Another object of the invention is to provide a sustained centripetal force approaching 2g's whereby the somatogravic illusion may be created.

Another object of the invention is to provide subthreshold pitch, roll and yaw motion speeds so as to create the disorientation effect known as "the leans".

Another object of the invention is to provide both power and bidirectional data transfer between the planetary axis and (cockpit) yaw axis without limiting rotation about either axis.

Other objects and advantages of the invention appear hereinafter.

BRIEF SUMMARY OF THE INVENTION

A spatial disorientation trainer-flight simulator comprising a cockpit mounted for independent rotation about pitch, roll and yaw axes. A direct drive motor is provided at each axis for rotating the cockpit. One computer is located onboard the cockpit. Another computer is located remotely of the cockpit. The computers are interconnected by slip ring means and are programmed to generate speed command signals which control the direct drive motors.

BRIEF DESCRIPTION OF THE DRAWINGS

FIG. 3 is a partial section taken along 3—3 in FIG. 2.

FIG. 4 is a partial section taken along 4—4 in FIG. 2.

FIG. 5 is an enlarged section of the planetary bearing assembly shown in FIG. 2.

FIG. 6 is a plan view of the yaw frame and yaw motor assembly.

FIG. 7 is a section of the yaw motor assembly taken along 7—7 in FIG. 6.

FIG. 8 is an enlarged partial section of the yaw motor assembly showing the bearings, tachometer and resolver.

FIG. 11 is a plan view of the yaw pedal assembly taken along 11—11 in FIG. 10.

DETAILED DESCRIPTION OF THE INVENTION

Figure 1:
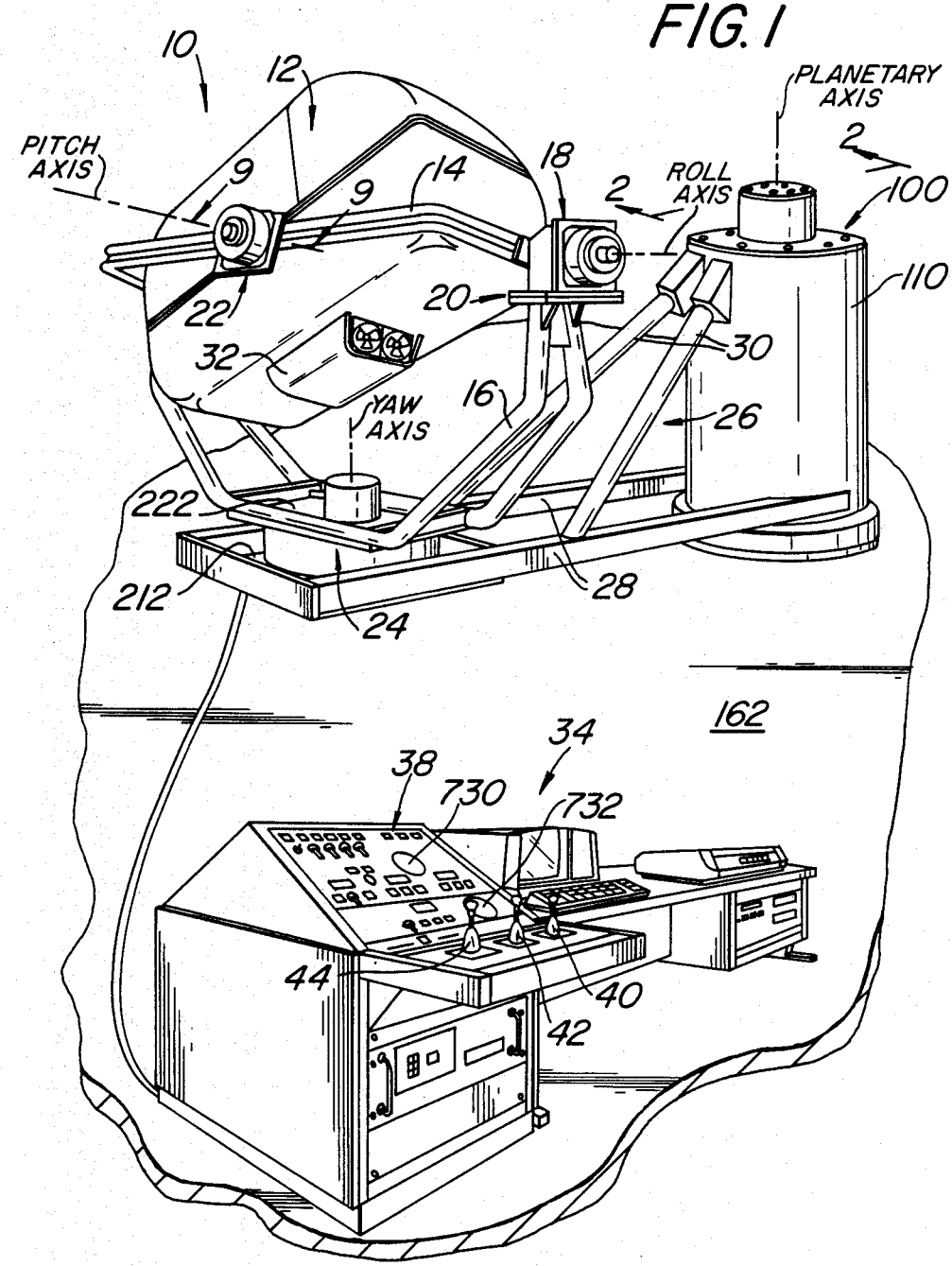
FIG. 1 is a perspective of the spatial disorientation trainer-flight simulator of the present invention showing the remote console, planetary motor assembly and cockpit.

Referring to the drawings, wherein like numerals indicate like elements, there is shown in FIG. 1 a spatial disorientation trainer-flight simulator 10 in accordance with the present invention. The trainer simulator 10 includes a cockpit 12 gimbaled on a roll frame 14 for rotation about a pitch axis. The cockpit 12 is rotated about the pitch axis by a pitch motor assembly 22 secured to roll frame 14. Roll frame 14 is in turn gimbaled on a yaw frame 16 for rotation about a roll axis. Roll frame 14 is rotated about the roll axis by a roll motor assembly 18 mounted on a support 20 secured to a yaw frame 16. The yaw frame 16 is gimbaled on a yaw motor assembly 24 for rotation about a yaw axis. The yaw motor assembly 24 is mounted at the free end of a planetary frame assembly 26 coupled to a planetary drive assembly 100 whereby the yaw motor assembly is rotatable about a planetary axis coincident with the longitudinal axis of the planetary drive assembly.

Planetary frame assembly 26 includes a pair of arms 28 secured by welding or the like to a movable cylindrical housing 110 which is part of drive assembly 100. A pair of struts 30 secure each arm 28 by welding or the like to the upper portion of housing 110. Yaw motor assembly 24, roll and yaw frames 14, 16, roll pitch and motor assemblies 18, 22 and cockpit 12 are all cantilevered with respect to the planetary drive assembly 100 by means of planetary frame assembly 26. Because the cockpit is not mounted on a ground track, but is cantilevered, the pilot experiences a truer sensation of flight.

The underside of cockpit 12 is provided with a computer housing 32. A cockpit computer is enclosed in the computer housing. The cockpit computer communicates with a console computer located at a remote console 34 via bidirectional motor control and data communications lines. The lines are connected to planetary motor slip ring and yaw motor slip ring assemblies described hereafter so that the rotational displacement of the planetary and yaw motors is not limited. Console 34 includes an instrument panel 38 and a pitch/roll joy stick 40, a yaw joy stick 42 and a planetary joy stick 44. Each of the yaw and planetary joy sticks is associated with a potentiometer which provides a raw (analog) speed command signal to the console computer. The pitch/roll joystick is associated with two potentiometers, one pitch and the other roll, each of which provide a raw (analog) speed command signal to the console computer.

In use, housing 110 is rotatably driven about the planetary axis thereby driving cockpit 12 about the planetary axis. A centripetal force is exerted on the cockpit (pilot) based on the planetary motor speed. As the cockpit revolves about the planetary axis, the pitch, roll and jaw motor assemblies are selectively activated to rotate the cockpit about any one or combination of the pitch, roll and yaw axes. A wide variety of spatial disorientation effects and illusions are therefore obtainable.

Referring to FIGS. 2–5, there is shown in detail planetary motor assembly 100. The assembly includes a cylindrical housing 110 secured to a ring plate 112. See FIG. 2. The ring plate is secured to the movable portion of a bearing assembly 116 described in greater detail hereafter. A motorized gear box assembly 120 is located within housing 110. The gear box assembly includes a gear box 122 directly driven by a high torque dc motor 124 secured to the gear box housing. Gear box 122 is secured to a stationary post 118. The gear box drives a hollow shaft 130 centered on the planetary axis, i.e., the longitudinal axis of planetary motor assembly 100. Shaft 130 is secured by a locking assembly 132 to a collar 134. See FIG. 3. The collar is secured to a ring-shaped drive plate 136 which is secured to a ringshaped support 140. Support 140 is secured by welding or the like to housing 110.

A slip ring assembly 142 is supported on spacers 144 and secured to collar 134. See FIGS. 2 and 3. A wiring conduit assembly 148 comprising telescoped wiring conduits 150, 152 houses cabling 158a. The cabling emanates from the console computer and is connected to the slip ring assembly contacts. See FIG. 3.

Wiring conduit 152 is supported on a ring plate 166 which is spaced from a plate 168 by a rubber spacer 170. See FIG. 4. Plate 168 is secured to stationary post 118. Plate 166 and spacer 170 retain conduits 150, 152 centered on the planetary axis.

Bidirectional motor control and data lines are sheathed in input cabling 158 which is fed through a floor conduit 159 and an opening 160 in post 118 to a wiring panel 161. The input cabling is connected at the wiring panel to cabling 158a and 158b. Cabling 158a extends through conduit assembly 148 to the slip ring assembly contacts as already described. Cabling 158b is connected to the planetary motor 124. The slip ring assembly contacts are connected to output cabling 163. Cabling 163 is fed through an opening 164 in housing 110 to the yaw motor slip ring assembly (FIG. 7) via planetary struts 30 and a wiring panel (not shown) located in arm 28.

Bearing assembly 116 is shown in greater detail in FIG. 5. The bearing assembly includes ball bearings 176 captured between an outer ring 178 and an inner ring 180. Outer ring 178 is secured to ring plate 112. A bearing retainer 182 is secured to the outer ring. The inner ring is secured to a ring plate 188. The ring plate 188 is welded to a collar 190. The collar supports post 118 and is secured by welding or the like to a floor brace 192.

In operation, the shaft of motor 124 is rotated under control of the console computer in response to signals carried by cabling 158b. The motor rotates shaft 130 about the planetary axis via gear box 122. Rotation of the shaft is transferred to rotation of housing 110 by means of locking assembly 132, collar 134 and drive plate 136. Rotation of the shaft is also transferred to rotation of slip ring assembly 142 by collar 134 and spacers 144. As the slip ring assembly rotates, motor control and data signals transmitted through cabling 158a are distributed throughout the system via the slip rings and cabling 163.

Utilization of planetary slip ring assembly 142 permits 360° rotation of housing 110, hence planetary frame assembly 26, yaw motor assembly 24 and cockpit 12, about the planetary axis. The planetary motor rotates so as to produce a centripetal force on the pilot (cockpit) proportional to the planetary motor speed. The planetary motor speed may be varied so as to produce a centripetal force of approximately 2g's on the pilot. The use of a high torque dc planetary motor and cantilevering of the cockpit about the planetary hub permit increased planetary motor accelerations and provide smooth cockpit motion about the planetary axis.

Referring to FIGS. 6–8, there is shown in detail yaw motor assembly 24. The jaw motor assembly includes a fixed outer ring 200 secured to a support plate 212. See FIG. 7. The support plate is part of planetary frame assembly 26 and is secured to planetary arms 28 by welding or the like. Ball bearing 214 is captured between outer ring 200 and a movable inner ring 216. Assembly 24 includes a yaw motor 218 which is a direct drive high torque dc motor. The motor is provided with a rotor 217 which is secured to inner ring bearing 216 by a key 220. The motor is also provided with a stator 219 which is secured to outer ring 200. Inner ring 216 is secured to a yaw frame support plate 222. Yaw frame 16 is secured by welding or the like to support plate 222.

Figure 2:
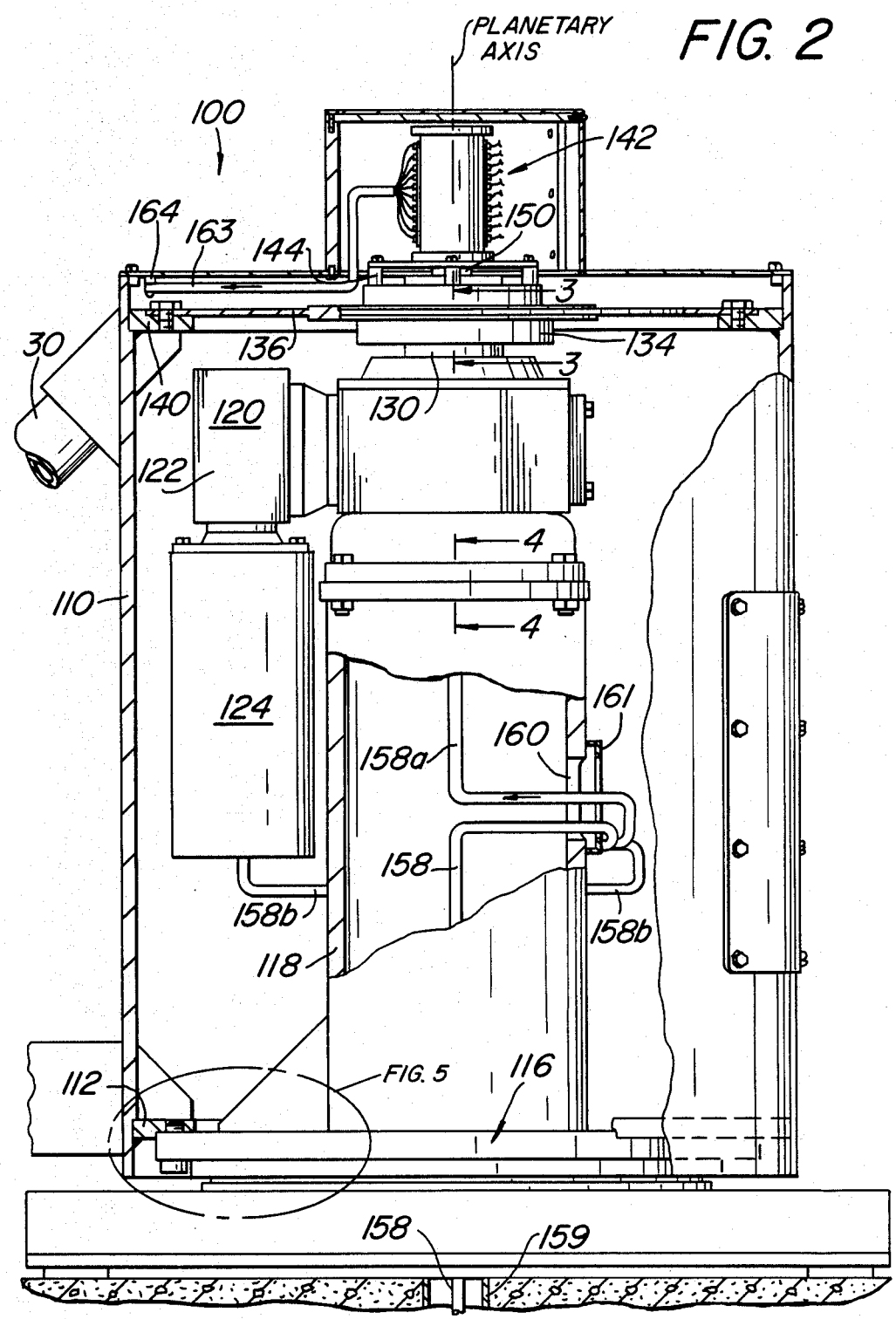
FIG. 2 is a partial section of the planetary motor assembly taken along 2—2 in FIG. 1.

Yaw motor assembly 24 includes a slip ring assembly 228 which is identical to planetary slip ring assembly 142 (FIG. 2). A wiring conduit 238 extends through a housing 240. A yaw tachometer 260 is located within the housing See FIGS. 7 and 8. A portion of the tachometer is secured to a movable inner ring 266. Ring 266 is secured to pulley 242. Ball bearing 268 is captured between ring 266 and a fixed outer ring 270. A yaw resolver 244 is coupled to pulley 242 by means of a belt 246 and is supported on a bracket 248 fastened to housing 240. Bidirectional motor control and data lines in cabling 163 interconnect the yaw and planetary slip rings. The yaw resolver leads 256 are connected to the planetary slip ring assembly contacts. The yaw tachometer leads 258 are connected to the planetary slip ring assembly contacts. The yaw slip ring assembly contacts 252 are connected to bidirectional motor control and data lines in cabling 165. See FIG. 7. Cabling 165 extends via yaw frame 16 to the cockpit computer and the pitch and roll motor drives as described hereafter.

In use, yaw motor 218 is rotated about the yaw axis. This produces like rotation of inner ring bearing 216 and slip ring assembly 228. Outer ring 200 remains fixed since it is coupled to support plate 212. As the yaw motor rotates, resolver 244 provides electrical signals indicative of the angular position of the yaw motor over leads 256 which are connected to the planetary slip ring assembly contacts. In addition, the tachometer provides electrical signals indicative of the speed of the yaw motor over leads 258 which are connected to the planetary slip ring assembly contacts.

Utilization of yaw slip ring assembly 228 permits 360° rotation of the yaw motor, hence yaw frame 16 and cockpit 12, about the yaw axis. Utilization of planetary arms 28 and yaw frame 16 as mechanical supports as well as cabling conduits, and the provision of slip ring assemblies at the yaw and planetary axes, eliminates any restraint on 360° rotation of cockpit 12 with respect to the yaw and planetary axes.

Figure 9:
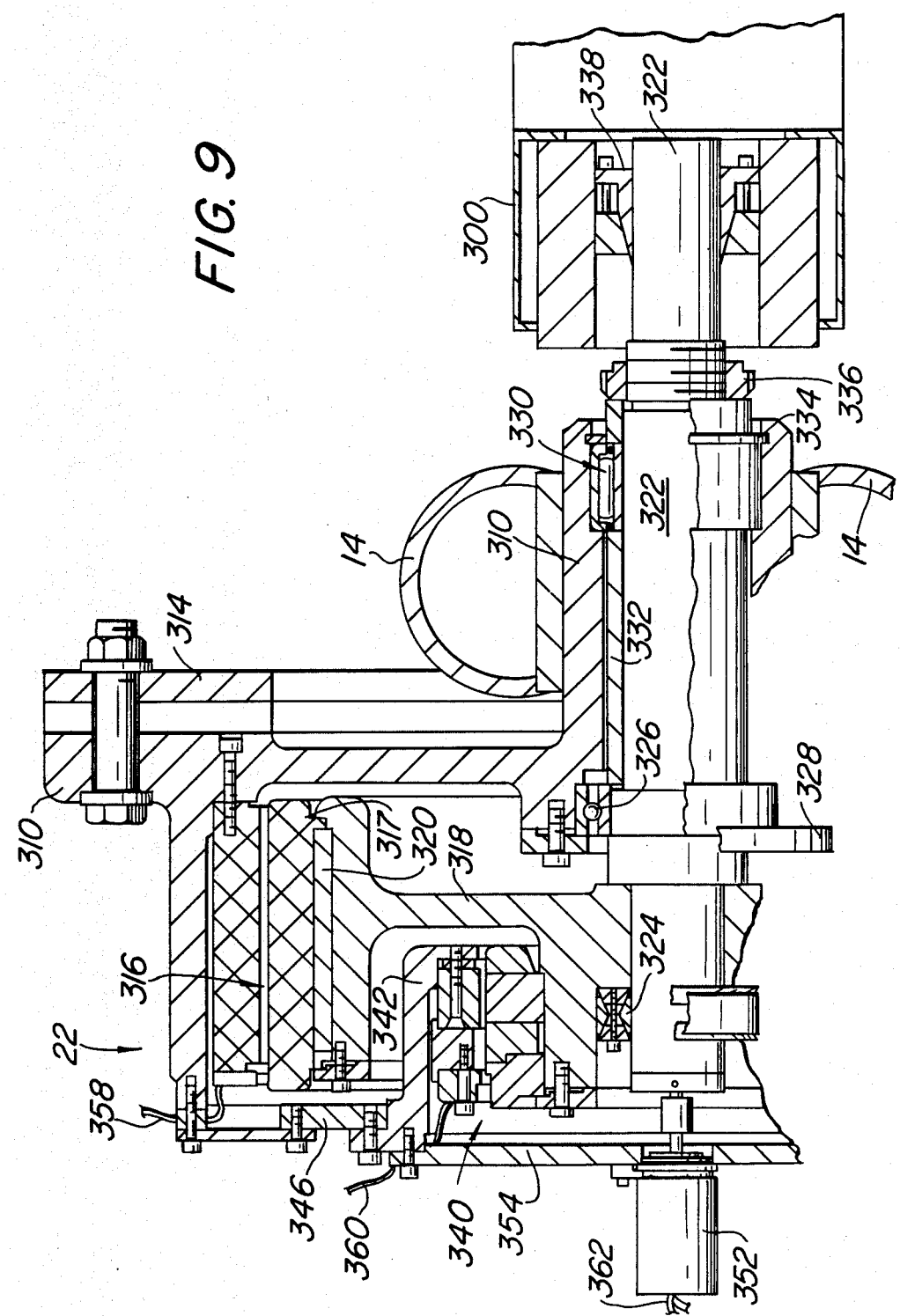
FIG. 9 is a partial section of the pitch motor assembly taken along 9—9 in FIG. 1.

Referring to FIG. 9, there is shown in detail the pitch motor assembly 22. The pitch motor assembly is coupled to roll frame 14 and cockpit frame 300. Pitch motor assembly 22 includes a motor housing 310 secured to a back plate 314 which is welded or otherwise secured to roll frame 14. The pitch motor 316 is a direct drive high torque dc motor. The motor is provided with a rotor 317 which is secured to a hub 318 by a key 320. Hub 318 is secured to the motor shaft 322 by means of a locking assembly 324. Shaft 322 is rotatable about its longitudinal axis, i.e., the pitch axis. The shaft is journaled in ball bearing 326 and roller bearing 330. Bearing 326 is secured in position by means of retainer 328. Bearing 330 is secured in position by means of sleeve 332, retaining ring 334 and motor housing 310. Sleeve 332 is secured in position by means of a lock nut 336 threaded on shaft 322. The end of shaft 322 is secured to the cockpit frame 300 by means of a locking assembly 338.

A pitch tachometer 340 is mounted in a housing 342 which is secured to housing 310 by a plate 346. A pitch resolver 352 is coupled to shaft 322. The resolver is mounted on a plate 354 which is secured to housing 342.

The pitch motor drive leads 358 are fed through an opening in plate 346 to a switch connected to the cockpit computer and to the yaw slip rings via yaw frame 16. Pitch tachometer leads 360 and pitch resolver leads 362 are fed to the cockpit computer.

In operation, pitch motor 316 is rotated about the longitudinal axis of shaft 322, i.e., the pitch axix. Cockpit frame 300 rotates with shaft 322 about the pitch axis. Pitch motor speed and position signals are transmitted over the tachometer leads 360 and resolver leads 362. Roll frame 14 remains unaffected by the rotation of shaft 322.

Figure 9A:
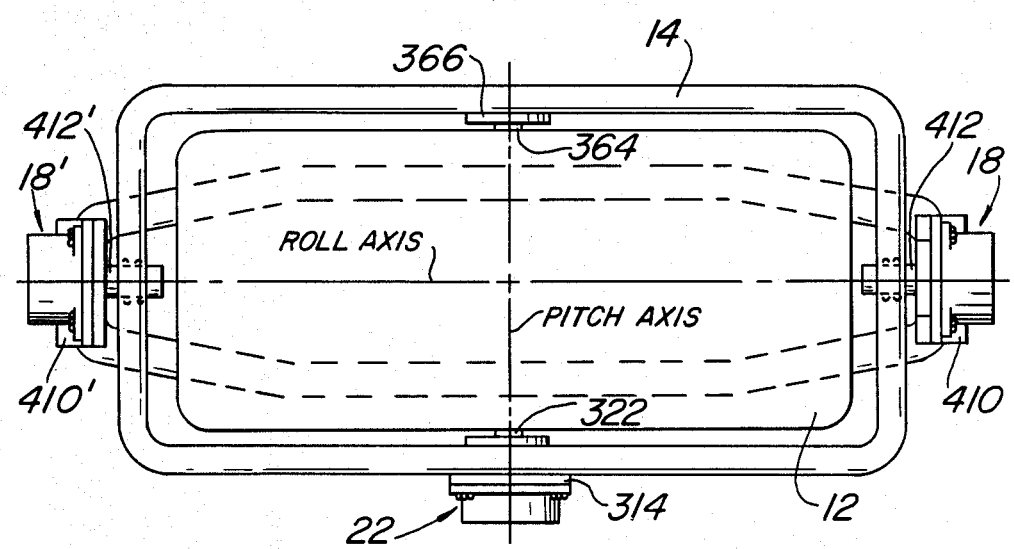
FIG. 9a is a plan view of the roll frame showing the roll motor assemblies and the pitch motor assembly.

Referring to FIG. 9A, a single pitch motor assembly 22 is utilized to rotate cockpit 12 about the pitch axis. The cockpit is provided with a stub shaft 364 journaled in a bearing 366 secured to the opposite side of roll frame 14. The longitudinal axes of shafts 322, 364 align to define the pitch axis. If desired, however, two pitch motor assemblies 22, 22' may be employed, in the manner previously described, on opposite sides of the roll frame. This allows even more effective displacement of the cockpit about the pitch axis.

In the embodiment described herein (FIG. 9), pitch motor assembly 22 is not provided with a slip ring assembly. The pitch motor is rotatable between angular limits of ±75° with respect to the pitch motor home or zero position. If, however, it is desired to rotate the cockpit over 360°, pitch motor assembly 22 may be modified to accomodate a slip ring assembly identical to the yaw slip ring assembly 228 already described (FIG. 7).

As shown in FIG. 9A, two roll motor assemblies 18, 18' are employed to rotate roll frame 14 about the roll axis. The roll motor assemblies are mounted in similar fashion on opposite ends of the roll frame. The aligned longitudinal axes of the roll motor shafts 412, 412' define the roll axis. Roll motor assembly 18 is identical to pitch motor assembly 22 (already described in connection with FIG. 9), being provided with a roll tachometer and roll resolver. Roll motor assembly 18' is identical to roll motor assembly 18 but is not supplied with a tachometer or resolver. Roll motor assemblies 18, 18' are driven in opposite directions to obtain the desired rotation of roll frame 14 about the roll axis.

Roll motor assembly 18 is mounted on a bracket 410 secured to yaw frame 16. The roll motor shaft 412 is secured to roll frame 14 by means of a locking assembly (not shown) which may be the same as pitch motor locking assembly 338 (FIG. 9). The rotation of shaft 412 about its longitudinal axis, i.e., the roll axis, results in like rotation of roll frame 14, hence cockpit 12, about the roll axis.

The roll motor assemblies are not provided with slip ring assemblies. Accordingly, angular rotation of the motors is limited to ±170° with respect to the roll motor home or zero position. If 360° rotation about the roll axis is desired, however, roll motor assembly 18' may be modified to accomodate a slip ring assembly such as yaw slip ring assembly 228 (already described in connection with FIG. 7).

Figure 10:
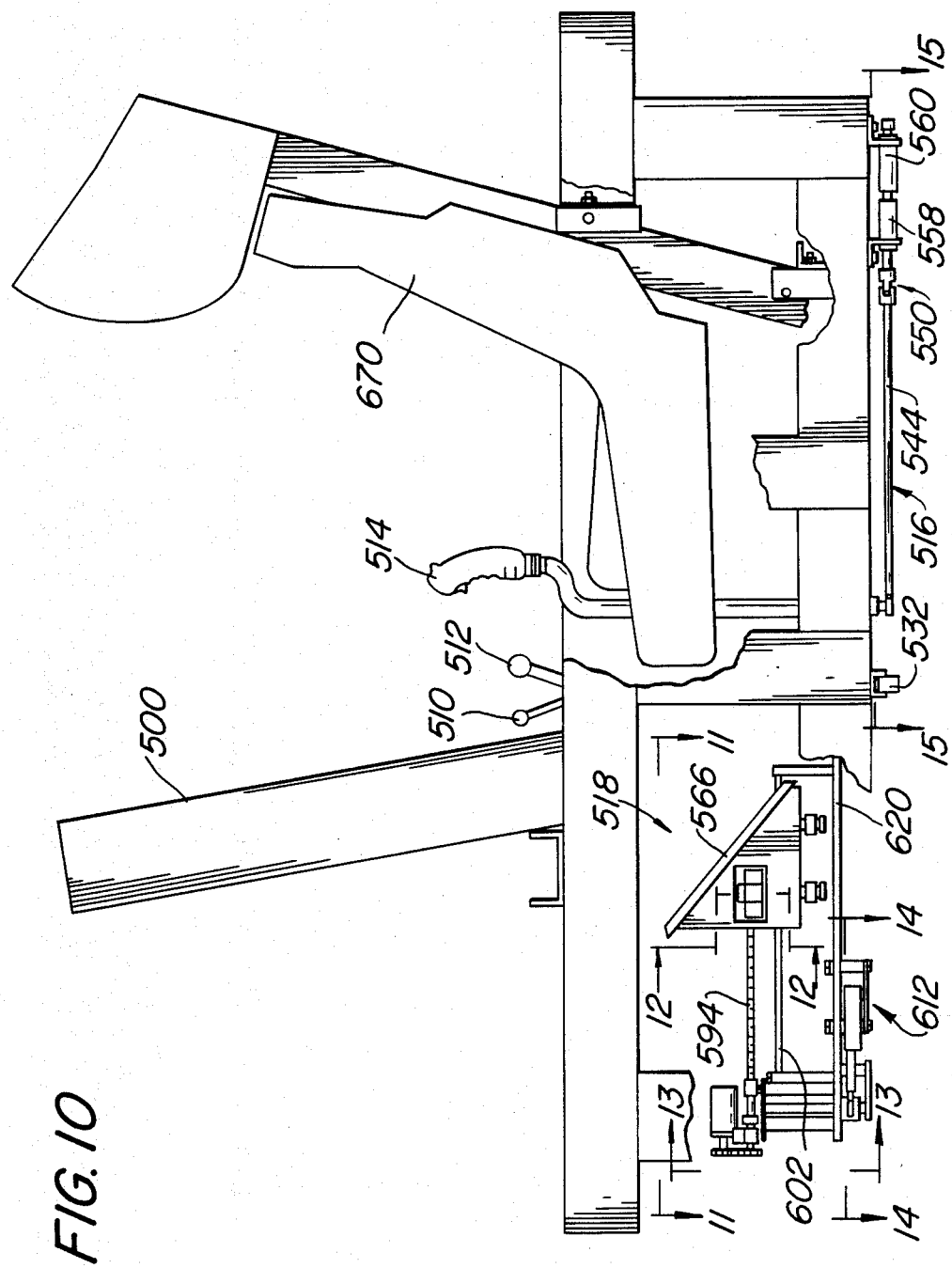
FIG. 10 is an elevation of the cockpit showing the yaw (rudder) pedal assembly.

The interior of cockpit 12 is shown in FIG. 10. The cockpit interior includes a cockpit seat 670, an instrument panel 500, a flap control lever 510, a throttle control leverl 512 and a pitch/roll joy stick 514. The flap control lever 510 and throttle control lever 512 are coupled to potentiometers which generate output signals based on lever position. These signals do not control the speed or position of any motors. They are only employed by the cockpit computer instrument algorithms. These algorithms operate the various instruments on panel 500 and are described in detail hereafter. The pitch/roll joy stick 514 is coupled to a pitch potentiometer and a roll potentiometer which generate output signals based on joy stick position. These signals affect pitch and roll motor position and speed, hence cockpit pitch and roll position and speed. The joy stick is coupled to a centering mechanism 516 which return the joystick to the vertical or zero position when it is released. Below the instrument panel, there is located a yaw (rudder) pedal assembly 518 which is coupled to a yaw potentiometer. The potentiometer generates output signals based on pedal position. These signals affect yaw motor position and speed, hence cockpit yaw position and speed. The yaw pedal assembly is coupled to a return mechanism 612 which returns the yaw pedals to the zero position when they are released.

Figure 15A:
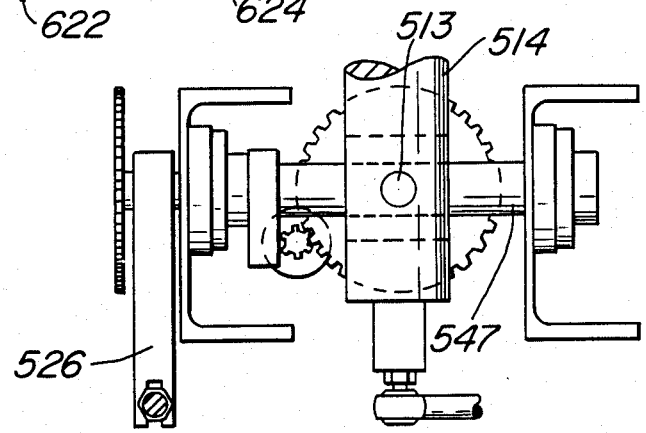
FIG. 15A is a section taken along 15A—15A in FIG. 15.
Figure 15:
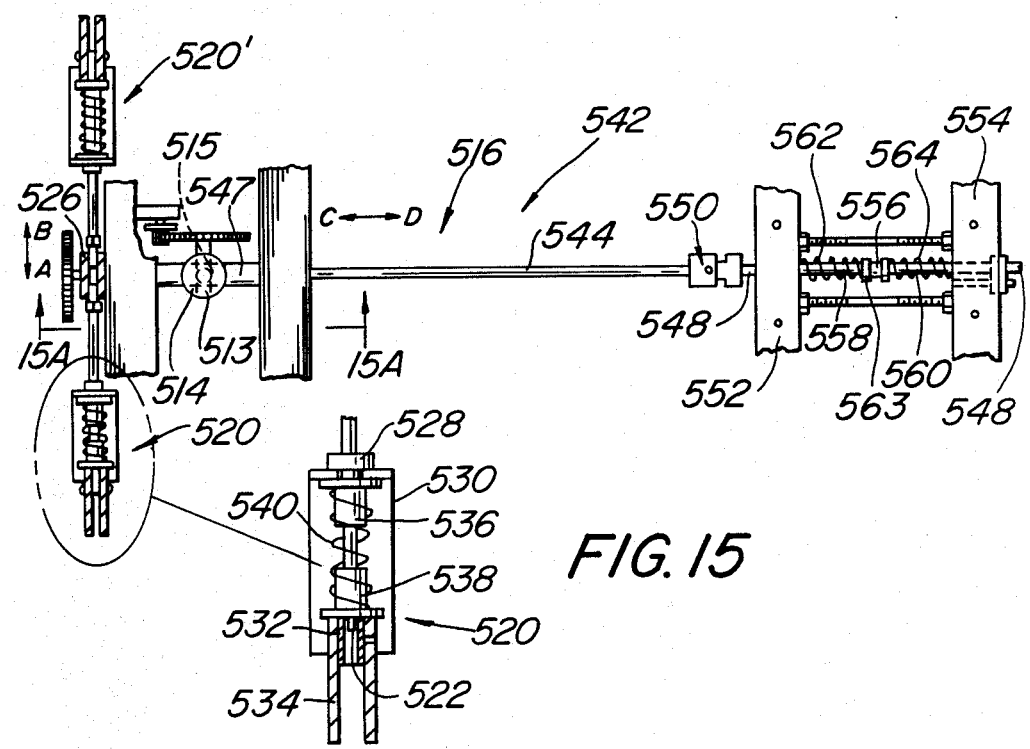
FIG. 15 is a plan view of the cockpit pitch/roll joy stick centering mechanism taken along 15—15 in FIG. 10.

The joy stick centering mechanism 516 is shown in FIG. 15. The centering mechanism includes a pair of identical roll loader assemblies 520, 520'. Description of roll loader assembly 520 pertains to roll loader assembly 520' as well. Roll loader assembly 520 includes a rod 522 which is pivotably coupled at one end to the lower end of an arm 526. Arm 526 is secured at its upper end to a shaft 547. The shaft is journalled at either end in fixed bearings (not shown) above the elevation of the roll loader assemblies. The joystick 514 is pivotably coupled to shaft 547 by means of a yoke (not shown) and a pin 513. The shaft therefore rotates about its longitudinal axis with roll movement of the joystick (in direction A or B) and the joystick rotates about the longitudinal axis of pin 513 with pitch movement of the joystick (in direction C or D). A collar 528 is pinned to rod 522. A sleeve retainer 530 is secured to a trunnion 532 which is pivotably mounted on cockpit floor brackets 534. A pair of sleeves 536, 538 are slidably mounted on rod 522. The sleeves are spaced apart by a compression spring 540.

In operation, roll movement of the joy stick in the direction of arrowhead B (away from the vertical or zero position) results in displacement of rod 522 in the opposite direction. Rod 522 slides inside sleeves 536, 538. Collar 528 urges sleeve 536 in the direction of arrowhead A against spring 54. When the joy stick is released, spring 540 urges sleeve 536 in the direction of roll arrowhead B. The sleeve urges collar 528, hence rod 522, in the direction of arrowhead B. The joystick travels in the opposite direction until the sleeve again contacts retainer 530. At this point, the joy stick is centered in the vertical or zero position.

The joy stick is mechanically coupled to a roll potentiometer (not shown in FIG. 15) which provides a raw (analog) roll motor drive input signal to the cockpit computer. The polarity of the signal depends on the direction (A, B) of travel of the joystick. The magnitude of the signal is proportional to the extent of travel of the joy stick with respect to the zero position. Direction of travel of the joystick determines the direction of displacement of the roll motor. The extent of travel of the joy stick determines the roll motor speed.

The joy stick centering mechanism 516 also includes a pitch loader assembly 542. The pitch loader assembly includes a rod 544 secured at one end to an extension 515 of the joy stick. Rod 544 is coupled at its other end to a rod 548 by means of a universal coupling 550. Rod 548 passes through suitable apertures in spaced brackets 552, 554 which are secured to the cockpit floor. A collar 556 is pinned to rod 548. A pair of sleeves 558, 560 are slidably mounted on rod 548 on opposite sides of collar 556. A compression spring 562 is mounted on sleeve 558 between the sleeve end flange 563 and bracket 552. A like compression spring 564 is mounted on sleeve 560 between the sleeve end flange and bracket 554. The compression springs urge sleeves 558, 560 into contact with collar 556 when the joy stick is centered in the vertical or zero position.

Pitch motion of the joy stick about the longitudinal axis of pin 513 in direction C (pitch down) displaces extension 515 in the opposite direction. This results in displacement of rod 544, hence rod 548, in direction D. Collar 556 urges sleeve 560 in the direction of arrowhead D against spring 564. When the joy stick is released, spring 564 urges sleeve 560 against collar 556, thereby moving rod 548, hence rod 544 and extension 515, in the direction C. The joystick travels in the opposite direction until the joy stick is centered in the vertical or zero position.

When the joy stick is moved in the direction of arrowhead D (pitch up), extension 515 moves in the opposite direction. Rod 544, hence rod 548, also move in the opposite direction. Collar 556 urges sleeve 560 in the direction of arrowhead C against spring 564. When the joy stick is released, spring 564 urges sleeve 560 against collar 556 thereby moving rod 548, hence rod 544 and plate 547, in the direction of arrowhead D. The joystick travels in the opposite direction until the joy stick is centered in the vertical or zero postion.

The joy stick is mechanically coupled to a pitch potentiometer (not shown in FIG. 15) which provides a raw (analog) pitch motor drive input signal to the cockpit computer. The polarity of the signal is determined by the direction (C,D) of travel of the joy stick. The magnitude of the signal is proportional to the extent of travel of the joy stick with respect to the zero position. The direction of travel of the joystick determines the direction of displacement of the pitch motor. The extent of travel of the joy stick determines the pitch motor speed.

Figure 12:
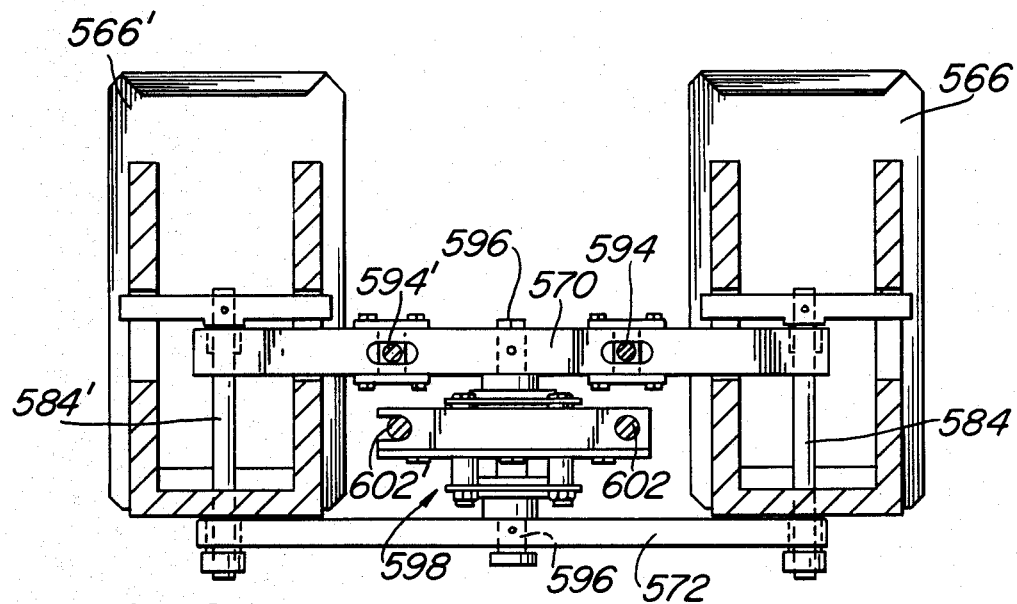
FIG. 12 is a section taken along 12—12 in FIG. 10.
Figure 13:
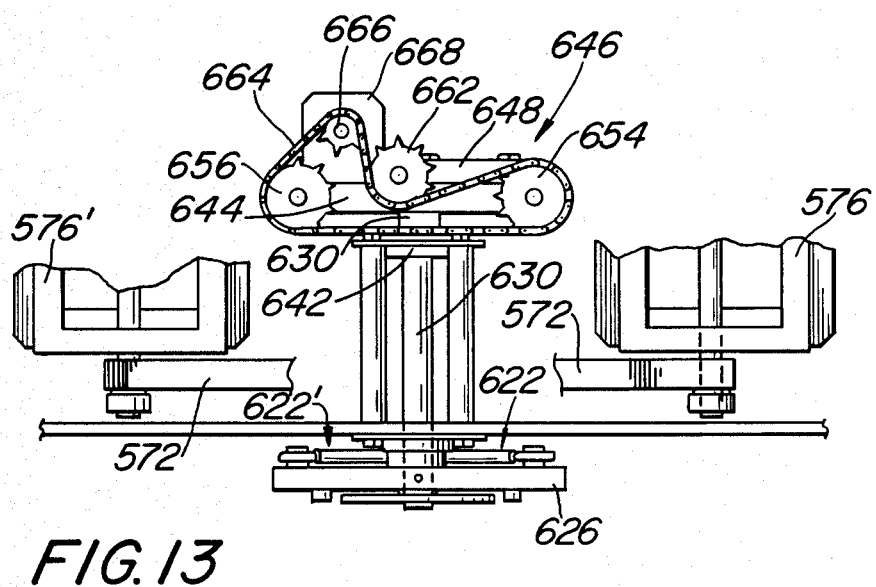
FIG. 13 is a front elevation of the yaw pedal assembly taken along 13—13 in FIG. 10.

The yaw pedal assembly is shown in FIGS. 11–13. Yaw pedals 566, 566' are identical and mounted in like manner as described hereafter. Description of pedal 566 shall suffice. Pedal 566 is mounted on a shaft 584 which is journaled in one end of a load arm 570. See FIG. 12. Load arm 570 is secured to a shaft 596 which is journaled in a pivot bearing assembly 598 mounted on a slide bearing assembly 600. The slide bearing assembly is slidably mounted on guide shafts 602, 602'. A fore stabilizer arm 572 (FIG. 12) is secured to shaft 596 for rotational movement therewith. A shaft 584 is journaled in one end of the fore stabilizer arm. Accordingly, pedals 566, 566', load arm 570 and fore stabilizer arm 572 are mounted for pivotal movement together about the longitudinal axis of shaft 596.

By pushing pedal 566 forward, in the direction of yaw arrowhead E in FIG. 11, pedals 566, 566', load arm 570 and fore stabilizer arm 572 are pivoted in the direction F about the longitudinal axis of shaft 596. Similarly, by pushing pedal 566' in the direction of yaw arrowhead G, the pedals, load arm and fore stabilizer arm are pivoted in the direction H about the longitudinal axis of shaft 596.

Figure 14:
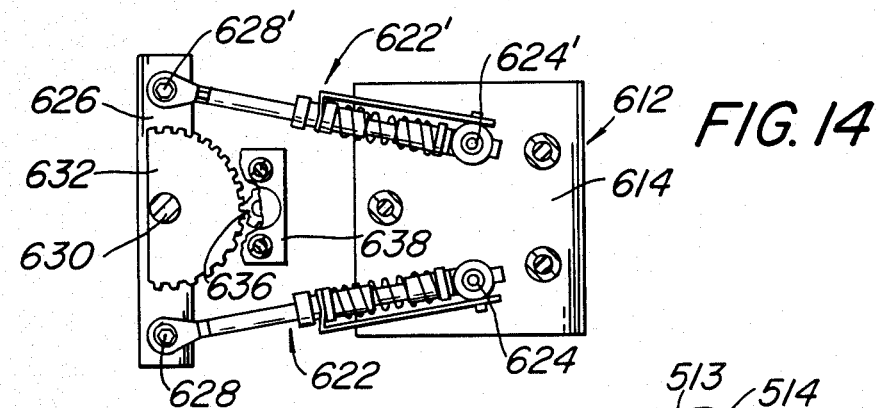
FIG. 14 is a plan section of the yaw pedal loader assembly taken along 14—14 in FIG. 10.

Yaw pedal assembly 518 is provided with a pivot return assembly 612. See FIGS. 10 and 14. The pivot return assembly includes a support plate 614 coupled to the cockpit floor. A pair of identical yaw pedal loader assemblies 622, 622' are pivotably coupled to plate 614 at pivots 624, 624'. See FIG. 14. Each pedal loader assembly is identical to roll loader assembly 520 already described (FIG. 15). The pedal loader assemblies ae pivotably coupled to a loader bar 626 at pivots 628, 628'. A gear segment 632 is secured to the loader bar for rotation therewith. Gear segment 632 is in mesh with a pinion gear 636. The pinion gear forms part of a yaw potentiometer 638. The yaw potentiometer generates a raw (analog) yaw motor drive input signal to the cockpit computer. The polarity of the signal is determined by the direction of rotation (F or H) of the pedals about shaft 596. The magnitude of the signal is determined by the extent of travel of the pedals in either direction. The polarity of the yaw potentiometer output determines the direction of rotation of the yaw motor. The magnitude of the yaw potentiometer output determines the yaw motor speed as described hereafter.

The yaw pedal assembly is coupled to a motorized leg adjustment assembly 646. See FIGS. 11 and 13. The assembly includes a shaft 630 which is journaled in bearings 642, 642'. See FIG. 11. The shaft is secured to a drive plate 644. An idler plate 648 is secured to drive plate 644. The load arm 570 is threadedly coupled by pivot nuts to a pair of lead screws 594, 594'. The lead screws are pivotably secured by universal coupling 652, 652' to driven sprockets 654, 656. An idler sprocket 662 is journaled in idler plate 648. Driven sprocket 654, 656 an idler sprocket 662 are entrained on a roller chain 664. The chain is driven by a drive sprocket 666 secured to the shaft of a motor 668 which is mounted on drive plate 644.

When either pedal 566 or 566' is pushed by the pilot, load arm 570 rotates in the direction F or H, thereby rotating shaft 596 and fore stabilizer arm 572 in the same direction. Accordingly, lead screws 594, 594' move in parallel but opposite directions. Drive plate 644 therefore rotates with shaft 630, about the longitudinal axis of the shaft, in the same direction of rotation as load arm 570. Loader bar 626 and gear segment 632 (FIG. 14) therefore move in the same direction. The pedal loader assemblies 622, 622' yieldingly accomodate rotation of loader bar 626. When the pilot releases pedals 566, 566', pedal loader assembly 622, 622' pivots loader bar 626, hence shaft 630, back to the initial or zero position. Gear segment 632 rotates back to its initial or zero position as does drive plate 644. Lead screws 594, 594' move in parallel but opposite directions back to their initial or zero positions, thereby returning pedals 566, 566' to their initial or zero positions (as shown in solid lines in FIG. 11).

The motorized leg adjustment assembly 646 is operated by the pilot so as to position pedals 566, 566' fore of cockpit seat 670 to suit the pilot's leg length. Thus, a pilot-operated push button switch (not shown) or the like is provided to complete an electrical signal path to motor 668. In response, the motor drives sprocket 666 in the appropriate direction. Driven sprockets 654, 656 rotate in like directions thereby rotating universal couplings and lead screws 594, 594' in like directions. Since load arm 570 is mounted by means of pivot nuts on the lead screws, the load arm, and pedals 566, 566' move fore or aft, depending on the direction of rotation of the lead screws, to accomodate the pilot's leg length.

Figure 16A:
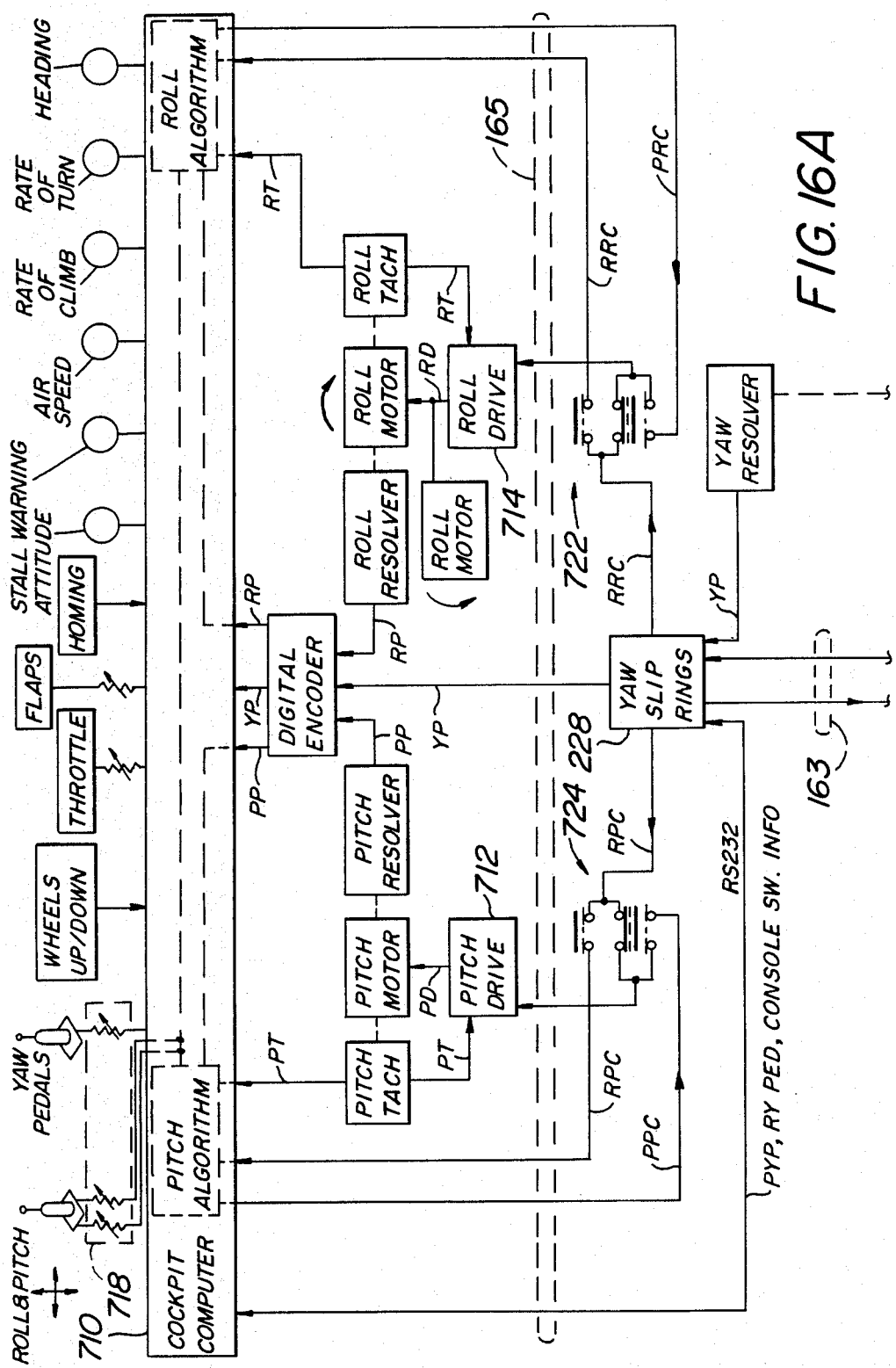
FIGS. 16A, B and C comprise a block diagram of the interconnection of the cockpit and console computers, the pitch, roll and yaw motor assemblies, and the yaw slip rings and planetary slip rings.
Figure 16B:
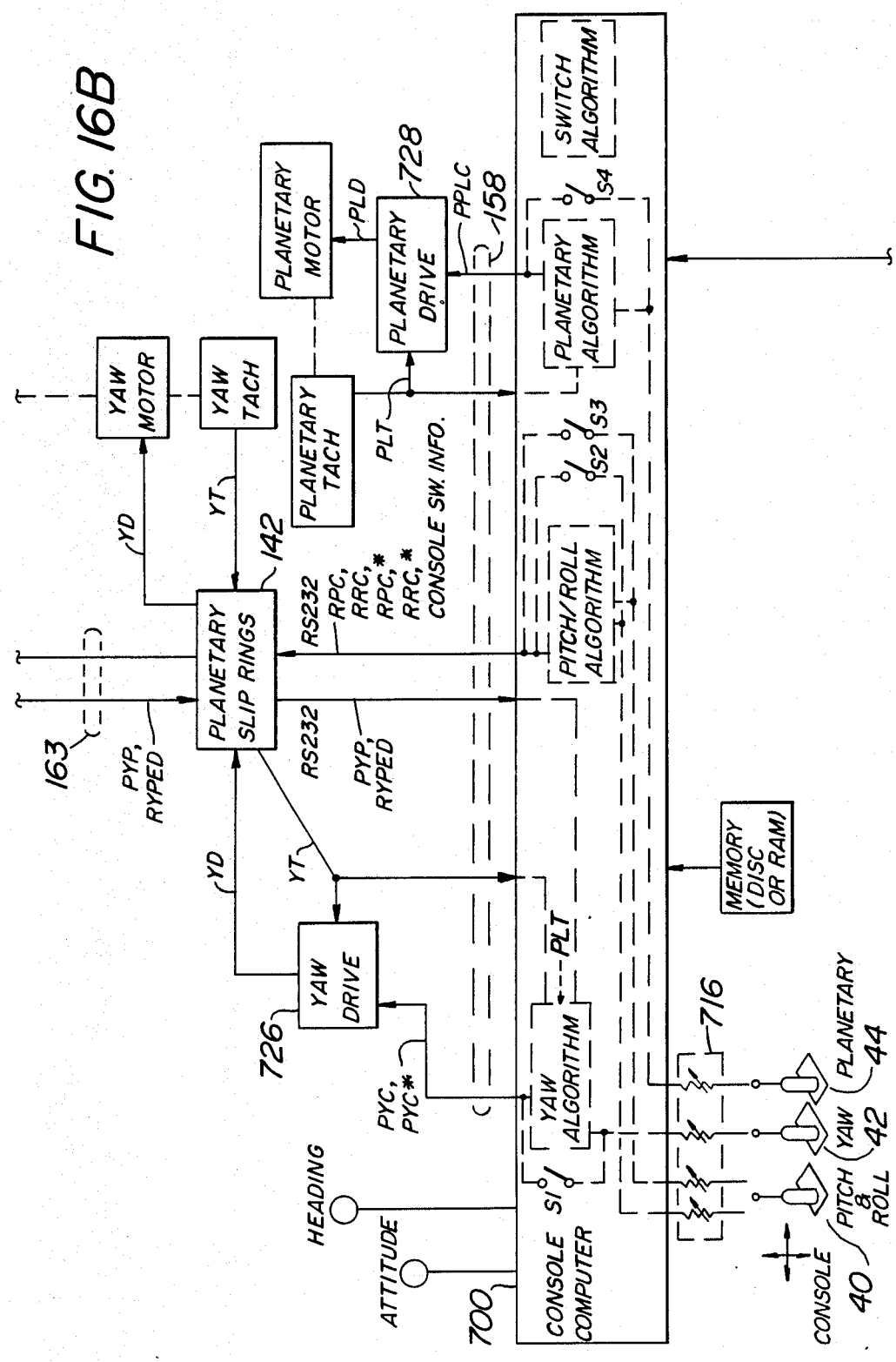
Figure 16C:
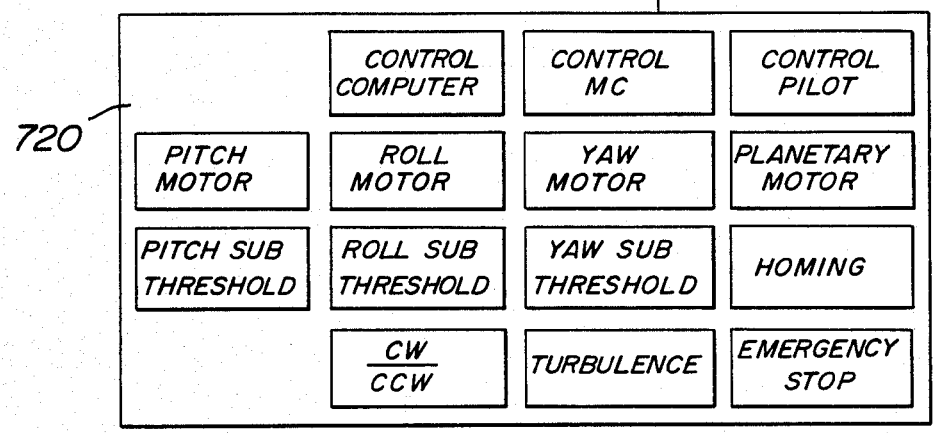

A block diagram of the control electronics for the invention, including the control electronics for the pitch, roll, yaw and planetary motors, is shown in FIGS. 16 A, B, C (referred to collectively as FIG. 16). The control electronics comprises console computer 700 and cockpit computer 710, each of which may be Analog Devices MACSYM 10 computers. Computers 700, 710 share processing tasks in connection with motor control and data signal generation and communication as described hereafter. Division of the processing tasks between the two computers facilitates control over the pitch, roll, yaw and planetary motors as described hereafter.

Console computer 700 and cockpit computer 710 are interconnected by way of the yaw slip rings 228 and planetary slip rings 142. Roll frame 14 and yaw frame 16 (FIG. 1) serve as conduits for cabling 163, 165 which interconnect the slip rings and cockpit computers.

Control of the pitch, roll and yaw motors may be exercised by the console or cockpit, while control of the planetary motor may be exercised by the console only. Thus, cockpit computer 700 controls pitch motor drive 712 and roll motor drive 714 in response to cockpit or console commands, and console computer 700 controls yaw motor drive 726 in response to cockpit or console commands. But the console computer controls planetary motor drive 728 in response to console commands only.

Control of the pitch and roll motor drives may be exercised by the cockpit computer in response to raw (analog) pitch and roll command signals generated by pitch and roll potentiometers associated with the console pitch/roll joy stick 40 or by pitch and roll potentiometers associated with the cockpit pitch/roll joystick. Control of the yaw motor drive may be exercised by the console computer in response to raw (analog) yaw signals generated by the potentiometer associated with the cockpit yaw pedal assembly or by the potentiometer associated with the console yaw joystick 42. Control of the planetary motor drive may be exercised by the console computer in response to raw (analog) planetary command signals generated by the potentiometer associated with the planetary joystick 44. The console joy stick potentiometers are designated collectively as 716 and the cockpit potentiometers are designated collectively as 718.

Control of all motor drives may also be exercised by the console and cockpit computers in response to preprogrammed pitch, roll, yaw and planetary command signals which are retrieved by the console computer from memory such as magnetic disk or RAM.

Operation of the console and cockpit computers in controlling the pitch and roll motor drives is determined by push buttom mode controls 720 located at console 34. The push button mode controls include a "control computer" switch, a "control MC" switch, and a "control pilot" switch. The control computer, control MC and control pilot switches are momentary contact switches. A switch algorithm is stored in the console computer memory. The switch algorithm determines the mode of operation of the computers based on the status of the control computer, control MC and control pilot switches. The algorithm is shown in FIG. 22.

The switch algorithm determines which switch was last depressed and distributes control over the pitch, roll, yaw and planetary drives accordingly. If the control MC switch was last depressed, the switch algorithm accords exclusive control of the pitch, roll, yaw and planetary drives to the console pitch/roll, yaw and planetary joy sticks. If the control computer switch was last depressed, the algorithm accords exclusive control of the pitch, roll, yaw and planetary motor drives to pre-programmed information retrieved from console disk (or RAM). If the control pilot switch was last depressed, the switch algorithm accords exclusive control of the pitch and roll motor drives to the cockpit pitch/roll joy stick. If the control pilot switch was last depressed and the planetary motor is stopped, the algorithm accords exclusive control of the yaw motor drive to the cockpit yaw pedals.

Figure 22:
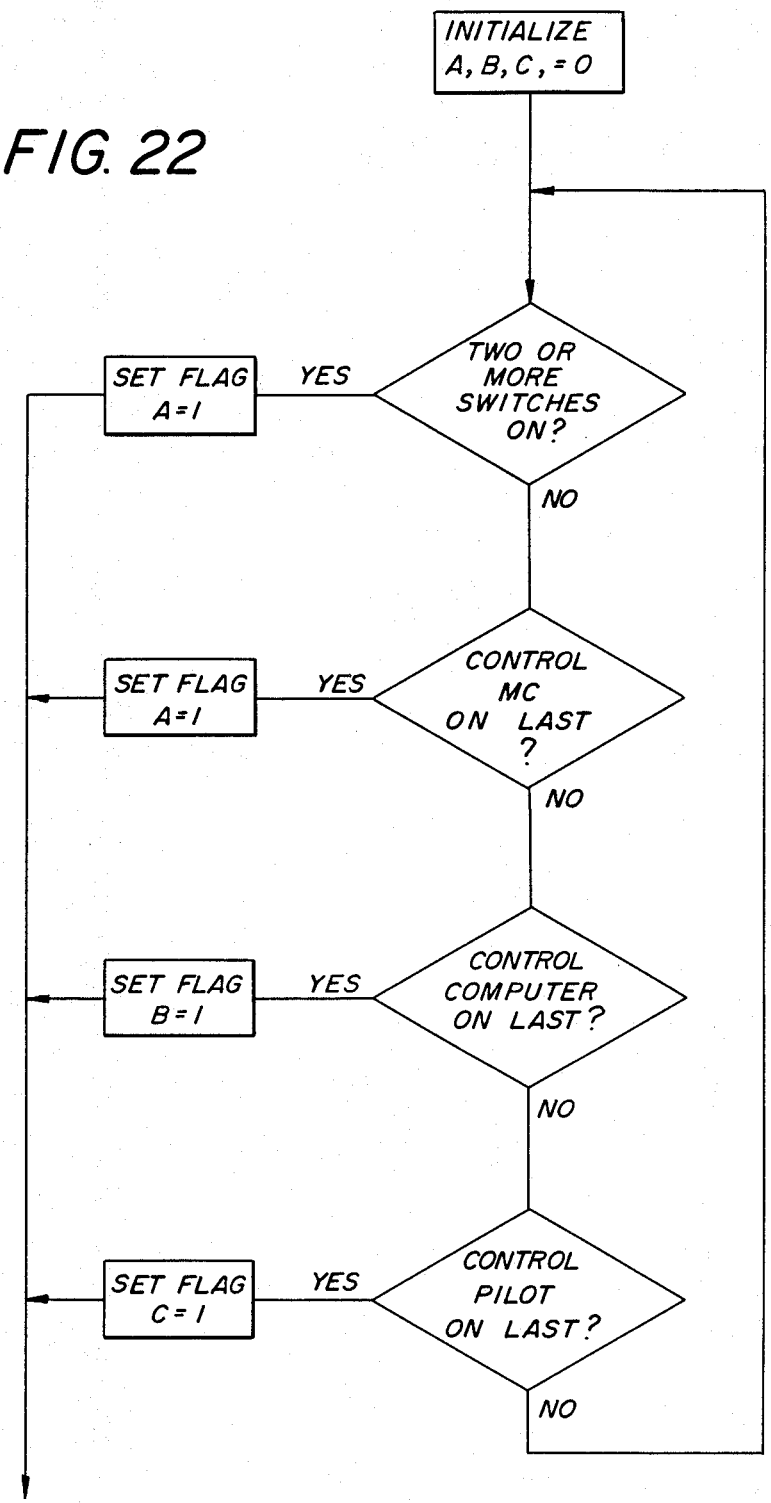
FIG. 22 is a flow chart of the console switch algorithm.

Referring to the flow chart shown in FIG. 22, the algorithm initially zeros a control MC flag A, a control computer flag B and a control pilot flag C. The algorithm then checks the control computer, control MC and control pilot switches to determine whether two or more of the switches have been simultaneously depressed. If so, the algorithm sets flag A. When flag A is set, this indicates that exclusive control over the pitch, roll, yaw and planetary motor drives is accorded to the console joy sticks. If two or more of the switches have not been depressed simultaneously, the algorithm determines which of the switches was depressed last. If the control computer switch was depressed last, the algorithm sets flag A to indicate that the console joy sticks are to exercise exclusive control over the pitch, roll, yaw and planetary motor drives. If the control MC switch was not depressed last, the algorithm determines whether the control computer switch was depressed last. If so, the algorithm sets flag B. When flag B is set, it indicates that the console disk (or RAM) is to exercise exclusive control over the pitch, roll, and planetary motor drives. If the control computer switch was not depressed last, the algorithm determines whether the control pilot switch was depressed last. If so, the algorithm sets flag C. This indicates that the cockpit pitch-/roll joy stick and yaw pedals are to exercise exclusive control over the pitch, roll and yaw motor drives. It should be noted that the planetary motor drive is controlled only by the console planetary joy stick or the console disk (or RAM).

The console pitch/roll algorithm generates the raw (analog) pitch command signal (RPC) and the raw (analog) roll command signal (RRC). See FIG. 16B. These signals are generated by the algorithm based on the console pitch/roll potentiometer outputs or based on pre-programmed information retrieved from the console disk (or RAM). As shown in FIGS. 16A and 16B, these signals are transmitted via the planetary and yaw slip rings and switches 722, 724 to the cockpit computer when switches 722, 724 are in the dashed line (normal) position. The cockpit computer is provided with separate pitch and roll algorithms, described hereafter, which process the console RPC, RRC signals and produce processed pitch command (PPC) and processed roll command (PRC) drive signals to the pitch and roll motor drives. The PPC and PRC signals are transmitted to the pitch and roll motor drives via switches 722, 724, when the switches are in the dashed line (normal) position shown in FIG. 16.

Figure 17:
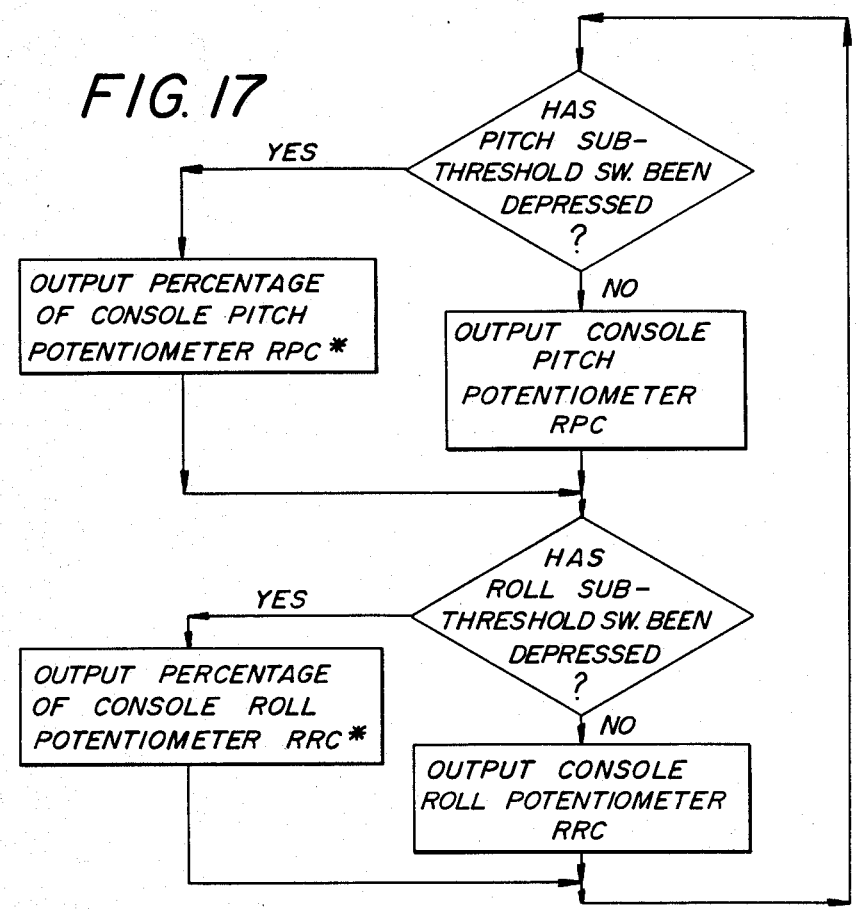
FIG. 17 is a flow chart of the console computer pitch-/roll algorithm.

The flow chart for the console computer pitch/roll algorithm is shown in FIG. 17. The console pitch/roll algorithm first determines whether the console "pitch sub-threshold" switch has been depressed. The switch is depressed to obtain sub-threshold speeds for the pitch motor, namely, speeds in the range of 0.5°/sec to 5°/sec. These speeds are so slow that resultant displacement of the cockpit in pitch (or roll) is not detectable by the pilot. Sub-threshold speeds are important, for example, in simulating the disorienting effect known as "the leans". If the pitch sub-threshold switch has not been depressed, the algorithm generates a raw (analog) pitch command signal RPC which is equal to the console pitch potentiometer output. If the pitch sub-threshold switch has been depressed, the algorithm generates a modified RPC signal, designated RPC*, which is a fixed percentage of the RPC signal which would otherwise be generated. The percentage is chosen so as to guarantee that, for the maximum magnitude of the RPC* signal, the speed of the pitch motor will be within the sub-threshold speed range, viz., 0.5°/sec-5°/sec.

The RPC and RPC* signals are transmitted via the yaw and planetary slip rings to the cockpit computer. See FIGS. 16A and 16B. The cockpit computer pitch algorithm gradually varies the pitch motor drive signal PPC, PPC* to attain smooth, continuous speed changes based on the RPC, RPC* signals.

The algorithm then scans the "roll sub-threshold" switch to determine whether the switch has been depressed. See FIG. 17. The switch is depressed to obtain sub-threshold roll motor speeds, namely, 0.5°/sec-5°/sec. If the roll sub-threshold switch has not been depressed, the algorithm generates a raw (analog) roll command signal RRC which is equal to the console roll potentiometer output. If the switch has been depressed, the algorithm generates a modified RRC signal, designated RRC*, which is a fixed percentage of the RRC signal which would otherwise be generated. The fixed percentage is shown to guarantee that, for the maximum magnitude of the RRC* signal, the speed of the roll motor will be within the sub-threshold range, namely, 0.5° sec-5°/sec.

Figure 18:
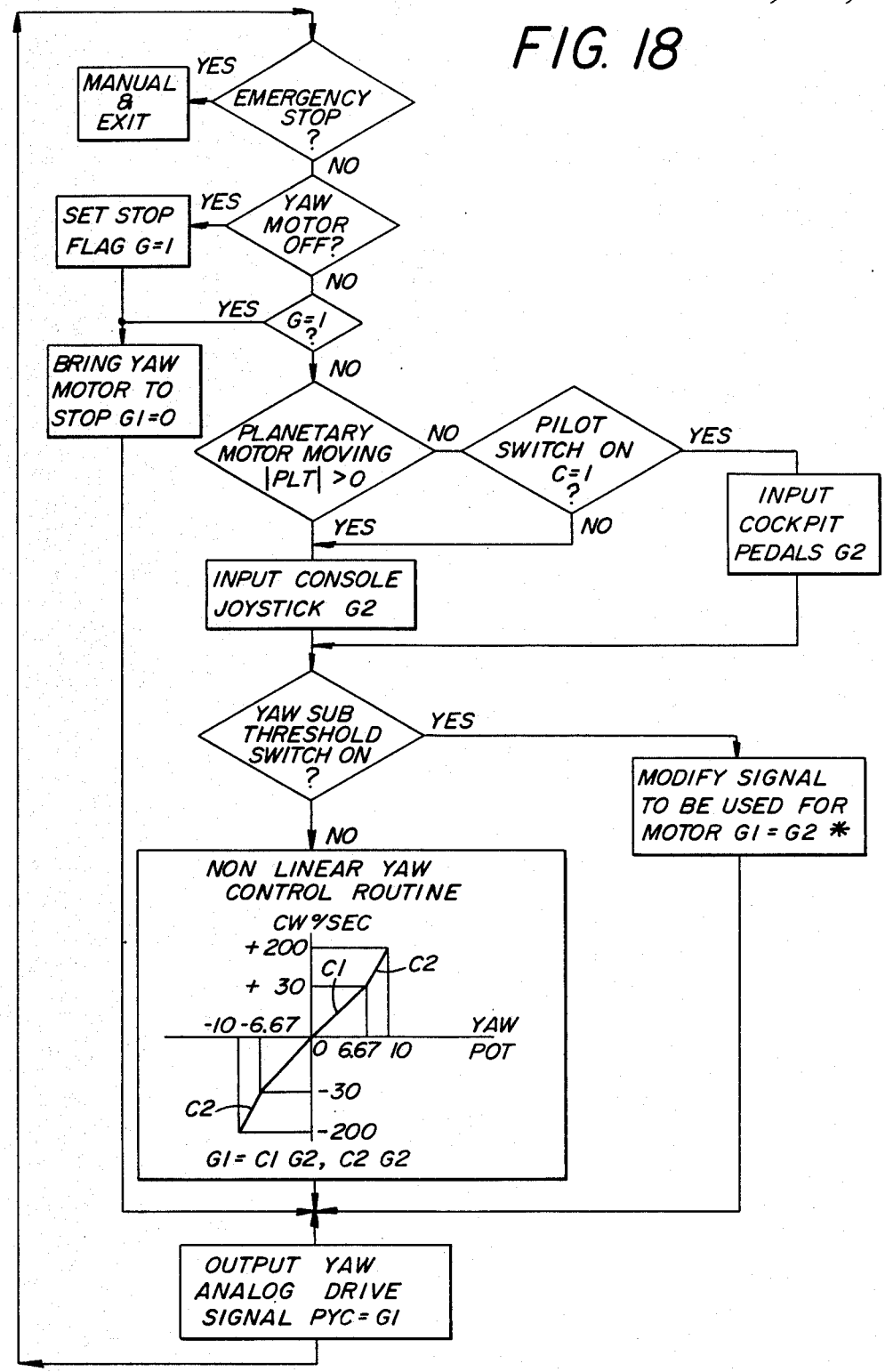
FIG. 18 is a flow chart of the console computer yaw algorithm.

The flow chart for the console computer yaw algorithm is shown in FIG. 18. The algorithm generates the processed yaw command signal (PYC) which drives the yaw motor drive 726 (FIGS. 16A and 16B). The algorithm first checks the console "emergency stop" switch and the console "yaw motor" switch. The emergency stop switch is depressed only in emergency conditions. If the switch is depressed, the algorithm places the system in a "manual" mode by generating a signal which closes a set of console switches S1-S4 and transfers switches 722, 724 to the solid line positions. See FIG. 16. Accordingly, the console pitch, roll, yaw and planetary potentiometer outputs are connected directly to the pitch, roll, yaw and planetary motor drives. The console operator exercises exclusive (manual) control over all motor drives. Motor speed changes are governed by the motor drive characteristics in response to the console pitch, roll, yaw and planetary potentiometer outputs. The cockpit and console computers are out of the control loop.

If the emergency stop switch has not been depressed, the yaw algorithm checks the status of the console yaw motor switch. The yaw motor switch is a pushbutton switch which completes a circuit from the yaw motor to an electrical power source when it is closed (on). If the yaw motor switch is on, the algorithm checks an emergency stop flag G. The emergency stop flag is set when the yaw motor switch is not on (off). If the emergency stop flag has been set, the algorithm sets a variable Z3 to zero and enters a digital filter routine which gradually brings the PYC motor drive signal to zero so as to halt the yaw motor. If the emergency stop flag has not been set, the algorithm checks the magnitude of the output of the planetary tachometer (PLT). The output of the tachometer indicates the speed of the planetary motor. If the tachometer output indicates that the planetary motor has stopped, the algorithm checks the control pilot flag C. If the control pilot flag has been set, indicating that the yaw motor is to be controlled by the cockpit yaw pedals, the algorithm enters the raw (analog) output of the yaw pedals potentiometer as a variable G2. If the control pilot flag has not been set, indicating that the yaw motor is to be controlled by the console yaw joy stick, the algorithm enters the raw (analog) output of the console yaw potentiometer as variable G2. Thus, if the planetary motor has stopped, and the control pilot switch has been depressed, the pilot is able to control the yaw motor by the cockpit yaw pedals. But if the planetary motor has not stopped, the algorithm enters the raw (analog) output of the console yaw potentiometer only, and the pilot is locked out of the yaw control loop. In other words, the pilot can only control yaw if the planetary motor has stopped.

The algorithm then checks the "yaw sub-threshold" switch. If the switch which has been depressed (on), indicating that sub-threshold yaw motor speeds are desired, the algorithm generates a modified raw yaw command variable (G2*) by multiplying the G2 variable by a fixed percentage. The fixed percentage is chosen to guarantee sub-threshold motor speed operation, i.e., 0.5°/sec-5°/sec, for the maximum value of G2*. If the yaw sub-threshold switch has not been depressed, the algorithm enters a non-linear yaw control routine wherein the inputted raw yaw command variable (G2) is operated on to generate the raw yaw command variable G2**.

The non-linear routine is chosen to provide accurate control of yaw motor speed by the console yaw joy stick or cockpit yaw pedals over the entire range of joy stick or yaw pedals positions. Preferably, the range of yaw motor speeds is ±200°/sec. Over the first two thirds of travel of the joy stick (or yaw pedals), in either direction about the joy stick (or yaw pedals) zero position, the yaw joystick (pedals) potentiometer output voltage varies between levels indicative of motor speeds of 0°/sec to +30°/sec or 0°/sec to −30°/sec, and the command viariable G2 is made proportional to a fixed multiple C1 of the potentiometer output (G2). Over the last ⅓ of travel of the joy stick (jaw pedals), in either direction about the zero position, the yaw joystick (pedals) potentiometer output voltage varies between levels indicative of ±30°/sec to ±200°/sec, and the command variable G2 is made proportional to a fixed multiple C2 of the potentiometer output (G2) wherein C2 is greater than C1. The non-linear yaw control routine therefore varies the yaw command variable G2 so as to guarantee that the yaw motor operates at speeds between ±30°/sec over the first two thirds of travel of the console yaw joy stick, (cockpit yaw pedals) and at speeds between ±30°/sec and ±200°/sec over the last one third of travel of the joy stick pedals. The command variable G2 is smoothed by the digital filter routine so as to gradually vary the PYC signal and bring the yaw motor to the desired speed in a smooth, continuous manner.

Figure 19:
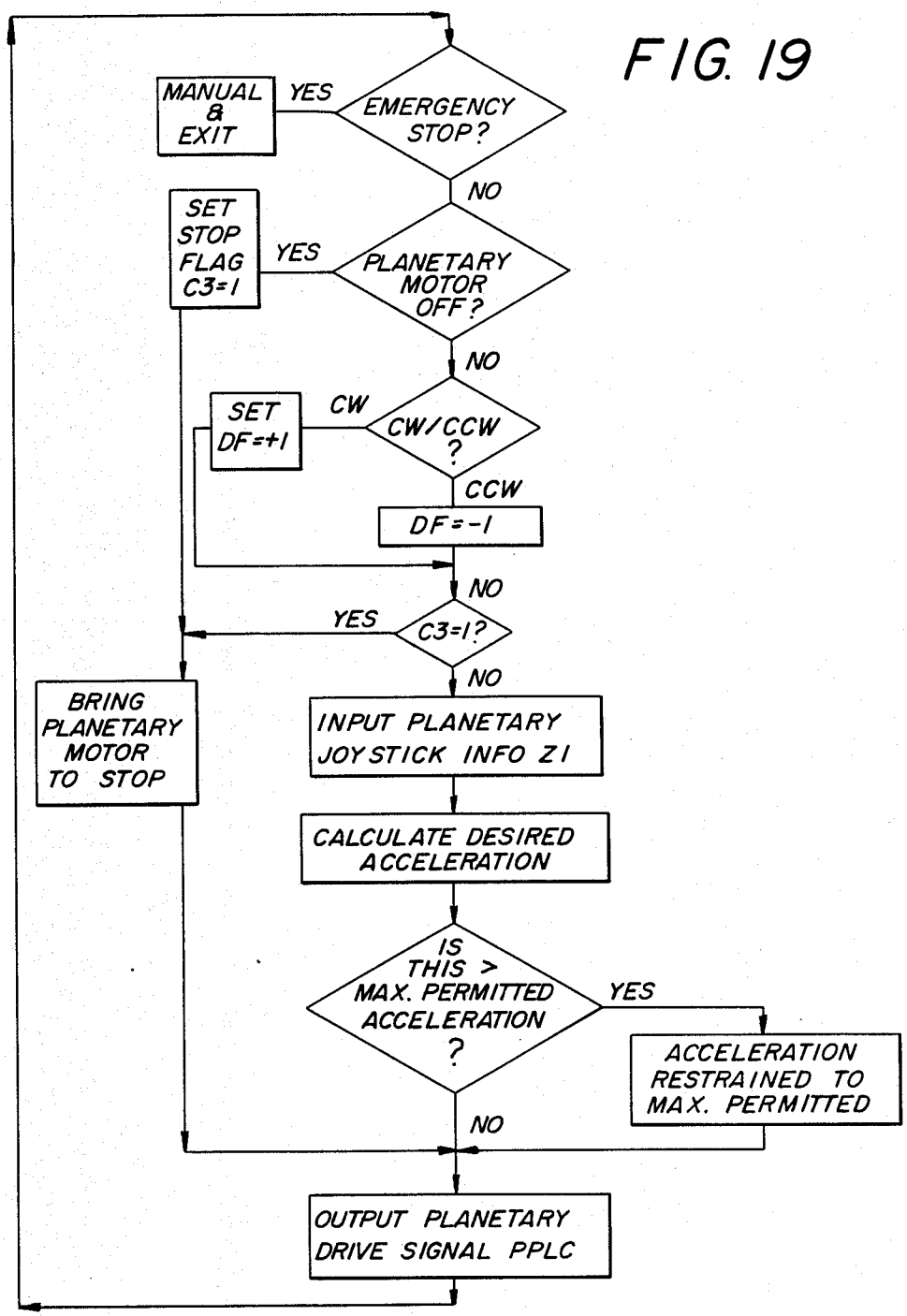
FIG. 19 is a flow chart of the console computer planetary algorithm.

The flow chart for the console computer planetary algorithm is shown in FIG. 19. The planetary algorithm generates the processed planetary command signal (PPLC) which directly drives the planetary motor drive 728 (FIG. 16). The algorithm first checks the console emergency stop switch to determine whether the switch is depressed. If the switch has been depressed, the algorithm operates switches S1-S4 and 722, 724 so that the console pitch, roll, yaw and planetary joy sticks exercise exclusive (manual) control of all motor drives. If the algorithm determines that the emergency stop switch has not been depressed, it then checks the status of the console "planetary motor" switch (FIG. 16). The planetary motor switch is a push-button switch which, when closed (on), completes a circuit which supplies power to the planetary motor. If the planetary motor switch is not on (off), the algorithm sets a stop flag C3, sets a variable Z1 to zero, and enters a digital filter routine which gradually brings the PPLC drive signal to zero so as to halt the planetary motor. If the algorithm detects that the planetary motor switch is on, it checks the status of the console "CW/CCW" switch. If the switch has been depressed, indicating clockwise planetary motor rotation, the algorithm sets a direction flag DF to +1. If the switch has not been depressed, indicating counterclockwise planetary motor rotation, the algorithm sets the direction flag DF to −1.

The algorithm then determines whether the emergency stop flag has been set. If so, the algorithm sets variable Z1 to zero and brings the PPLC signal to zero so as to halt the planetary motor. If the emergency stop flag has not been set, the algorithm inputs the console planetary potentiometer output as variable Z1. The algorithm then computes the acceleration required to bring the planetary motor speed to the speed indicated by the console planetary potentiometer output. If the required acceleration exceeds a maximum permitted acceleration, the algorithm produces a PPLC signal which will result in a speed rate of change of the planetary motor equal to the maximum permissible acceleration. If the calculated acceleration does not exceed the maximum permissible acceleration, the algorithm produces a PPLC signal which results in a speed rate of change of the planetary motor equal to the calculated acceleration. The algorithm then loops back to check the emergency stop, planetary motor and CW/CCW switches.

Figure 20A:
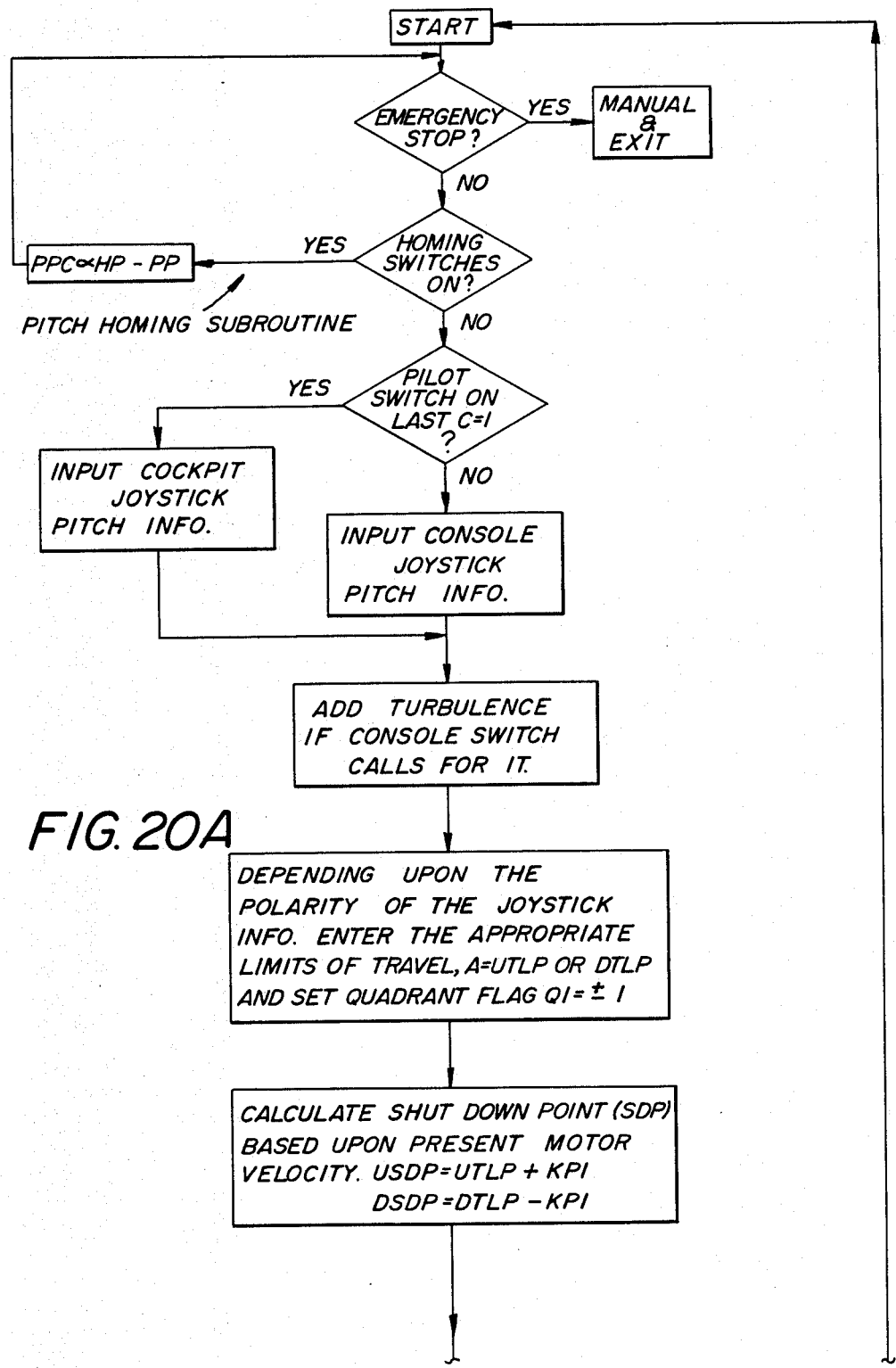
FIGS. 20A and B comprise a flow chart of the cockpit computer pitch algorithm.
Figure 20B:
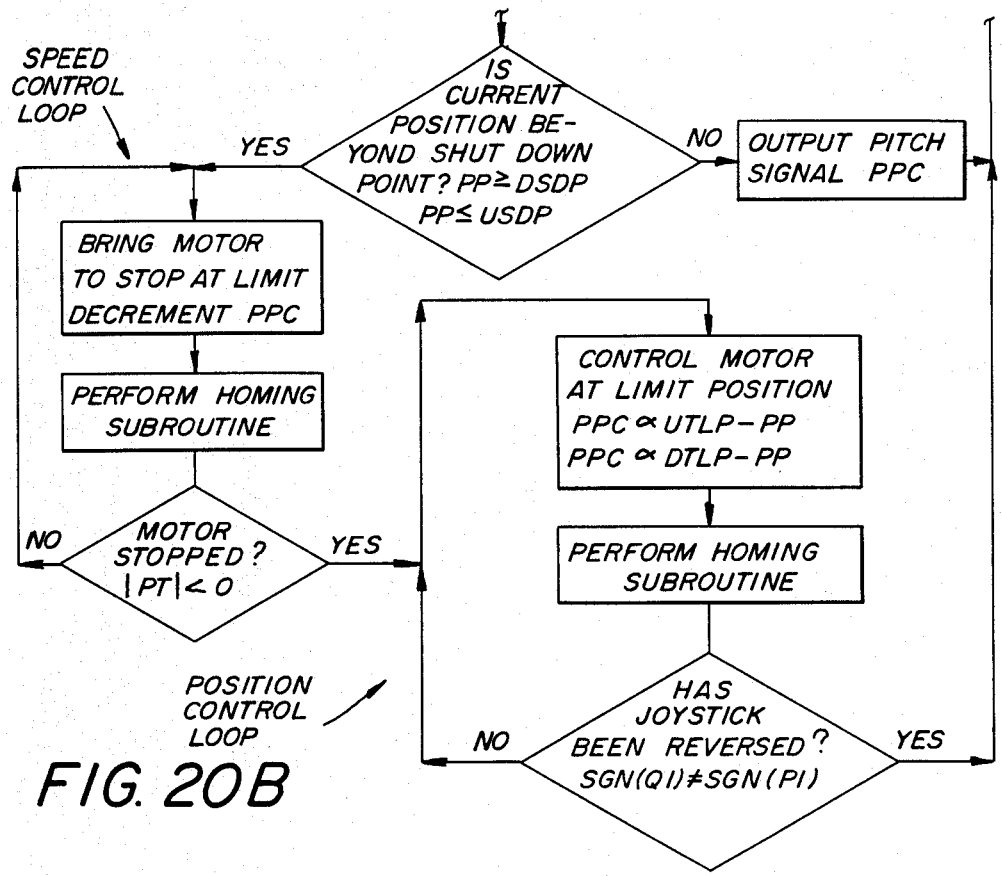

The cockpit computer generates the processed pitch and roll command signals (PPC, PRC) in accordance with pitch and roll algorithms stored in the cockpit computer memory. The PPC and PRC signals are generated by the algorithms based on the console or cockpit pitch/roll joystick positions. The cockpit computer pitch algorithm is shown in FIGS. 20A and B.

In the pitch algorithm, the cockpit computer first enters a "homing" subroutine wherein it checks the console emergency stop switch, a cockpit "homing" switch and a console "homing" switch. If the emergency stop switch is depressed (on), the algorithm transfers exclusive (manual) control of the roll motor drives to the console joy sticks as already described. If the emergency stop switch is not depressed, and either of the "homing" switches are depressed, the algorithm generates a processed pitch command signal (PPC) which is proportional to the difference between a fixed constant HP, representative of the pitch motor "home" or zero position, and the actual pitch motor position as indicated by the pitch resolver output (PP). The pitch motor is therefore maintained at the "home" position. If neither of the "homing" switches are depressed, the algorithm checks the control pilot flag. If the flag indicates that the control pilot was depressed last (on) the algorithm inputs the cockpit pitch potentiometer output as a variable P1. If the flag indicates that the control pilot switch was not depressed last, the algorithm inputs the raw (analog) RPC signal generated by the console computer pitch algorithm as variable P1.

The cockpit pitch algorithm then checks the status of a "turbulence" switch at the console panel. Information as to the status of the switch is transmitted by the console computer to the cockpit computer via the yaw and planetary slip rings (FIG. 16). If the turbulence switch is depressed (on), the algorithm adds a randomly generated number to variable P1 (a random number generation subroutine is provided for this purpose). This simulates the effect of turbulence during flight. The algorithm then checks the polarity of variable P1. The polarity indicates the direction, i.e., up or down, in which the pitch motor is to be moved. If the polarity of the inputted signal is positive, indicating that the pitch motor is to be moved so as to dip the cockpit, the cockpit computer sets a variable A to a down travel limit position (DTLP) value. If the polarity of the inputted signal is negative, indicating that the pitch motor is to be moved so as to rotate the cockpit upwardly, the cockpit computer sets the variable A to an up travel limit position (UTLP) value. The UTLP and DTLP values represent the upper and lower angular limit positions for pitch motor rotation. Preferably, the UTLP and DTLP limits are ±75° with respect to the pitch motor home or zero position. The algorithm also sets a quadrant flag Q1 (±1) so as to indicate the desired direction of travel (up or down) of the pitch motor.

The algorithm then calculates a shut down point (SDP) which is a position of the pitch motor near the selected angular limit position (UTLP or DTLP). If the UTLP limit has been selected, corresponding to upward movement of the cockpit, the shut down point is equal to the UTLP limit value plus a multiple K of the variable P1 pitch signal. If the DTLP limit has been selected, corresponding to downward movement of the cockpit, the shut down point is equal to the DTLP limit value minus a multiple K of the variable P1. Thus, the shut down point SDP is a position of the pitch motor which is near the limit position (UTLP or DTLP) and which is spaced from the limit position by a factor which is proportional to the magnitude of the variable P1, i.e., the magnitude of the desired pitch motor speed. For lower desired pitch motor speeds, the shut down point is closer to the limit position (UTLP or DTLP).

The algorithm then checks the pitch resolver output (PP) to determine whether the pitch motor has reached the shut down point. If the pitch motor position has not reached the shut down point, the algorithm outputs a processed pitch command signal (PPC) to the pitch motor drive which is equal to variable P1. If the pitch position, as indicated by the resolver output PP, has reached the shut down point, the algorithm enters a speed control loop. In this loop, the algorithm enters a digital filter routine wherein the P1 variable is smoothed and then outputted as the PPC signal. This causes the pitch motor drive to gradually slot the pitch motor. The algorithm then enters the "homing" subroutine wherein the pitch motor is brought to the "home" position if either "homing" switch is depressed. If neither "homing" switch is depressed, the algorithm checks the pitch tachometer output PT. If the magnitude of the PT signal is greater than zero, indicating that the pitch motor has not stopped, the algorithm loops back to further smooth the PPC signal and slow the pitch motor. When the magnitude of the PT signal falls to zero, indicating that the pitch motor has stopped, the algorithm enters a position control loop wherein the PPC signal is made proportional to the difference between the selected limit position (UTLP or DTLP) and the actual position of the pitch motor as indicated by the pitch resolver output PP. The algorithm then enters the "homing" subroutine. If neither "homing" switch has been depressed, the algorithm then compares the sign of the quadrant flag Q1 with the sign of the variable P1. A reversal in sign of variable P1 indicates a reversal in polarity of the inputted pitch signal, i.e., a reversal in the desired direction of travel of the pitch motor. If the sign of variable P1 has not been reversed, it will be the same as the sign of the quadrant flag. In that case, the algorithm continues to control the pitch motor drive so as to maintain the pitch motor at the selected limit position (UTLP or DTLP). If the sign of the inputted pitch signal has reversed, the algorithm loops back to the start.

Figure 21A:
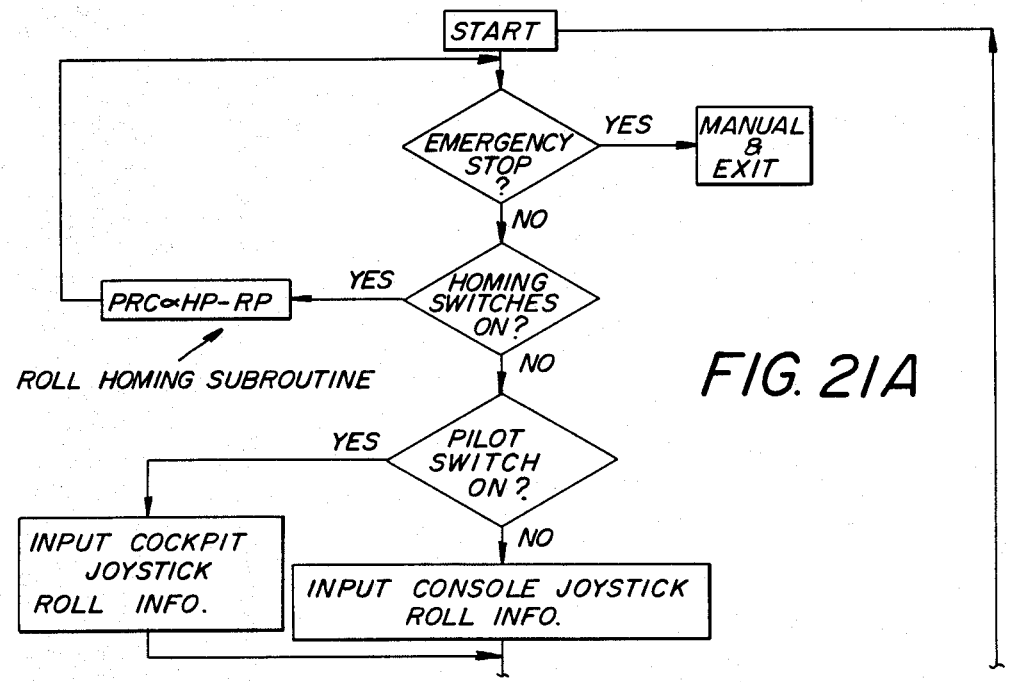
FIGS. 21A and B comprise a flow chart of the cockput computer roll algorithm.
Figure 21B:
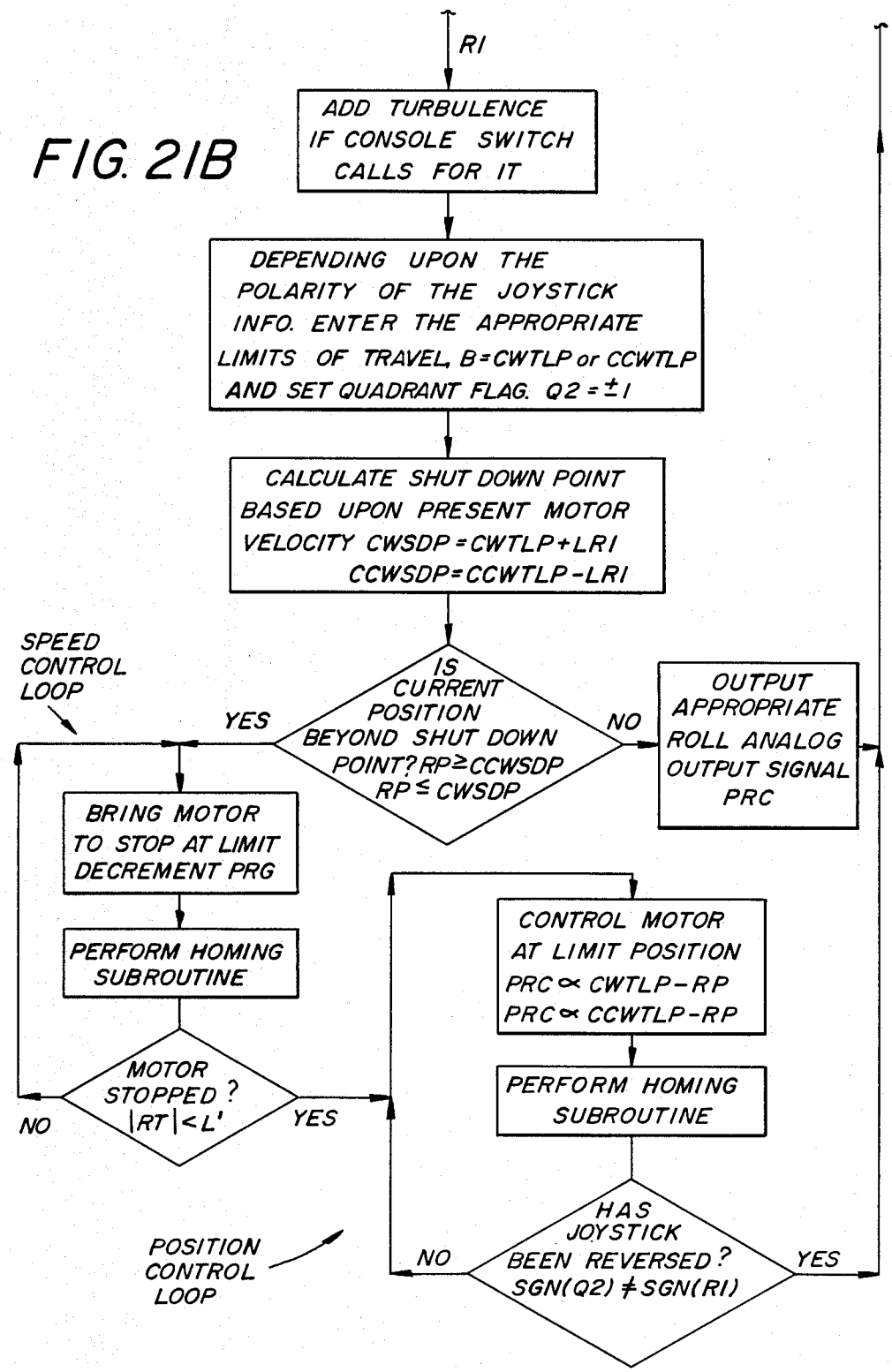

The cockpit computer roll algorithm is identical to the pitch algorithm. Thus, the roll motor is controlled in the same manner as the pitch motor. The roll algorithm is shown in FIGS. 21A and B. In this algorithm, the cockpit roll potentiometer output or the console roll potentiometer output is inputted as a variable R1. The roll motor limit position variable is designated B, and the selectable limit positions are designated CWTLP (clockwise travel limit position) and CCWTLP (counter-clockwise travel limit position). Preferably, the limits are ±170° with respect to the roll motor home or zero position. The quadrant flat is designated Q2. The shutdown point corresponding to clockwise rotation of the roll motor is equal to the CWTLP limit plus a fixed multiple L times the variable R1. The shut down point corresponding to counter-clockwise rotation of the roll motor is equal to the CCWTLP limit minus a fixed multiple L times the variable R1. To determine whether the roll motor position has reached the shut down point, the roll resolver output RP is compared to the shutdown point. In the speed control loop, the roll motor is brought to a stop at the selected limit position (CWTLP or CCWTLP) by smoothing the variable R1 by a digital filter routine and outputting the smoothed variable as the PRC signal. The algorithm determines whether the roll motor has stopped by comparing the magnitude of the roll tachometer output (RT) to zero. In the position control loop, the PRC signal is made proportional to the difference between the roll resolver output RP and the selected limit position (CWTLP or CCWTLP) so as to maintain the roll motor at the selected limit position.

Figure 23:
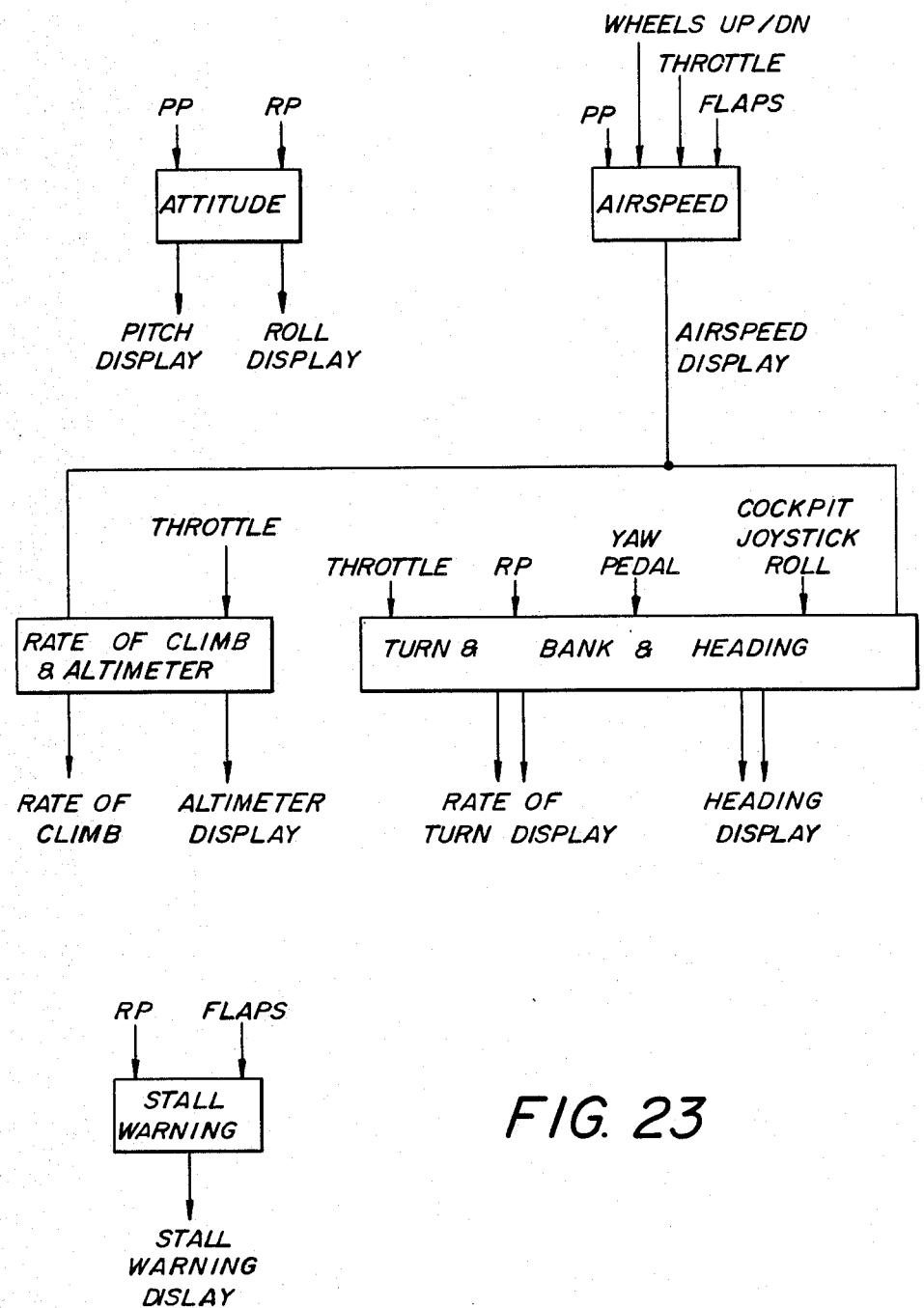
FIG. 23 is a flow chart of the cockpit-instrumentation algorithm.

The cockpit instrument panel 500 (FIG. 10) is provided with attitude, air speed, rate of climb, altimeter, turn and bank, and heading indicators. These indicators are controlled by algorithms located in the cockpit computer memory. The indicators simulate real flight readings based on pilot operation of the throttle lever, flap lever, yaw pedals, cockpit pitch/roll joy stick, a cockpit wheel up/down switch, and the pitch and roll resolver outputs PP, RP. See FIGS. 16 and 23.

In the attitude algorithm, the cockpit computer inputs the pitch and roll resolver outputs PP, RP. The algorithm generates a pitch signal which drives the pitch display portion of the attitude indicator. The pitch signal is proportional to the difference between the pitch motor home position (a fixed constant) and the actual pitch motor position as indicated by the pitch resolver output PP. The attitude algorithm also computes a roll signal for the roll display portion of the attitude indicator. The roll signal is proportional to the difference between the roll motor home position (a fixed constant) and the actual roll motor position as indicated by the roll resolver output RP.

In the air speed algorithm, the cockpit computer produces an air speed signal which drives the air speed indicator. The algorithm inputs the pitch resolver output PP. The air speed signal is made inversely proportional to the square root of the sum of the pitch resolver output PP and the output of the flap lever potentiometer. The pitch resolver output PP accounts for the effect of pitch angle on lift-off velocity, and the flap potentiometer output accounts for the effect of flaps position on lift-off velocity. The air speed signal is also reduced by a slow down factor when the cockpit wheel up/down switch indicates that the wheels (landing gear) are in the down position. The air speed signal is also increased by a factor which varies in direct proportion to the output of the throttle lever potentiometer.

The air speed signal is used in the rate of climb and altimeter algorithm. This algorithm generates a rate of climb signal which drives the rate of climb indicator and an altimeter signal which drives the altimeter. The rate of climb signal is proportional to the difference between the thrust of the aircraft and the sum of the induced drag and parasite drag. The thrust is directly proportional to the air speed signal and is a non-linear function of the throttle potentiometer output. The parasite drag is a non-linear function of the air speed signal. The induced drag is inversely proportional to the air speed signal. The rate of climb signal is smoothed to derive the altimeter signal.

The turn and bank and heading algorithm generates a rate of turn signal for driving the rate of turn indicator and a heading signal for driving the heading indicator. The turn and bank and heading algorithm computes the cockpit roll bank angle in radians based on the roll motor home position (fixed constant) and the actual roll motor position as indicated by the roll resolver output RP. One component of the rate of turn signal drives the needle portion of the rate of turn indicator. This component is made proportional to the difference between the yaw pedal potentiometer output and the cockpit roll potentiometer output, plus a factor which is proportional to the tangent of the bank angle and inversely proportional to the air speed signal. The component of the rate of turn signal which drives the ball portion of the rate of turn indicator is made proportional to the difference between the yaw pedal potentiometer output and the roll motor position as indicated by the roll resolver output RP.

The heading signal also comprises two component signals. One component is made proportional to the sine of the component which drives the needle portion of the indicator of the rate of turn signal. The other component is made proportional to the cosine of the component which drives the ball portion of the indicator of the rate of turn signal.

The cockpit computer instrument panel also includes a stall warning indicator, such as a lamp or horn, which is controlled by a stall warning algorithm stored in the cockpit computer memory. The stall warning algorithm computes the roll bank angle based on the difference between the roll motor home position (fixed constant) and the actual roll motor position as indicated by the roll resolver output RP. The algorithm then calculates the stall velocity which is proportional to the output of the flap lever potentiometer multiplied by a factor which is inversely proportional to the roll bank angle. The algorithm then compares the computed stall velocity to the air speed signal. If the air speed signal is less than the stall velocity, the algorithm generates a stall warning display signal so as to turn the stall warning indicator on. If the air speed signal is not less than the stall velocity, the stall warning display signal maintains the stall warning indicator off.

It should be understood that, in the embodiment of the invention described herein, the algorithms which control cockpit position and velocity in response to cockpit and console commands may utilize proportional as well as integral control loops to make flight simulation more realistic.

The present invention may be embodied in other specific forms without departing from the spirit or essential attributes thereof and, accordingly, reference should be made to the appended claims, rather than to the foregoing specification, as indicating the scope of the invention.

We claim:

1. Spatial disorientation trainer-flight simulator, comprising:
   a cockpit;
   means for mounting the cockpit for independent rotation about pitch, roll and yaw axes;
   motor means for rotating the cockpit about the pitch, roll and yaw axes in response to speed command signals and for rotating the cockpit about at least one of said pitch, roll and yaw axes at a sub-threshold speed in response to a sub-threshold speed command signal to demonstrate a vestibular illusion;
   pilot manipulable control means located at said cockpit for generating pilot command signal;
   operator control means located at a console station for generating operator command signals;
   cockpit computer means located at said cockpit and console computer means located at said console station, said cockpit and console computer means being interconnected to generate said speed command signals including said sub-threshold speed command signal in response to at least at one of said pilot and operator command signals; and
   means including a slip ring assembly for interconnecting said cockpit and console computer means.

2. Spatial disorientation trainer-flight simulator according to claim 1 including:
   means for mounting the cockpit for independent rotation about a planetary axis at a location spaced from said pitch, roll and yaw axes;
   planetary motor means for rotating the cockpit about the planetary axis in response to a planetary speed command signal; and
   said slip ring assembly being located at at least one of said yaw axis and said planetary axis.

3. Spatial disorientation trainer-flight simulator comprising:
   a cockpit;
   means for mounting the cockpit for independent rotation about pitch, roll and yaw axes;
   motor means for rotating the cockpit about the pitch, roll and yaw axes in response to speed command signals and for rotating the cockpit about at least one of said pitch, roll and yaw axes at a subthreshold speed in response to a subthreshold speed command signal to demonstrate a vestibular illusion;
   means for mounting the cockpit for independent rotation about a planetary axis at a location spaced from said pitch, roll and yaw axes;
   planetary motor means for rotating the cockpit about the planetary axis in response to a planetary speed command signal;
   pilot manipulable control means on-board said cockpit for generating pilot command signals;
   operator control means located remotely of said cockpit for generating operator command signals;
   cockpit computer means located at said cockpit and console computer means located remotely of said cockpit being interconnected so as to generate said speed command signals including said subthreshold speed command signal in response to at least one of said pilot and operator command signals; and
   means for interconnecting said cockpit and console computer means including a slip ring assembly located at at least of one of said yaw axis and said planetary axis.

4. Spatial disorientation trainer-flight simulator according to claims 2 or 3 including tachometer meamns for generating a signal indicative of the speed of the planetary motor means, at least one of said cockpit computer means and said console computer means connected to said tachometer means for generating a yaw speed command signal for said motor means if the signal generated by said tachometer means indicates that said planetary motor means has not stopped, and the other of said cockpit computer means and said console computer means including means for generating the yaw speed command signal otherwise.

5. Spatial disorientation trainer-flight simulator according to claims 2 or 3 wherein said means for mounting the cockpit for independent rotation about the planetary axis includes means for coupling said cockpit and said planetary motor means in cantilever relation.

6. Spatial disorientation trainer-flight simulator according to claim 2 or 3 including emergency stop switch means, said console computer means including means for detecting a state of said emergency stop switch means and means for generating a speed command signal in response so as to bring said planetary motor means to a halt.

7. Spatial disorientation trainer-flight simulator according to claim 6 including manual control means for superseding said cockpit and console computer means by generating said speed command signals in response to said operator manipulable control means independently of said cockpit computer means and said console computer means.

8. Spatial disorientation trainer-flight simulator according to claims 1 or 3 wherein at least one of said console and cockpit computer means includes means for adding a random factor to at least one of said speed command signals whereby said motor means rotates the cockpit in response to said at least one speed command signal to simulate flight turbulence.

9. Spatial disorientation trainer-flight simulator according to claims 1 or 3 including yaw pedal means onboard the cockpit for generating a raw output signal, said cockpit computer means being programmed to generate a yaw speed command signal based on said raw output signal, said pedal means being displaceable in a linear path, and means for displacing said pedal means so as to adjust the position of said pedal means along said path.

10. Spatial disorientation trainer-flight simulator according to claims 1 or 3 wherein said motor means includes means for rotating the cockpit about at least one of said pitch, roll and yaw axes at speeds of approximately 200°/sec. to demonstrate aircraft flat spin and wherein at least one of said cockpit computer means and console computer means includes means for generating a speed command signal for operating said means for rotating the cockpit at approximately 200°/sec.

11. Spatial disorientation trainer-flight simulator according to claim 1 or 3 wherein said subthreshold speed is approximately 0.5°/sec–5°/sec.

12. Spatial disorientation trainer-flight simulator according to claim 1 or 3 wherein at least one of said cockpit and console computer means includes means for limiting the speed of said planetary motor means to a preselected limit speed.

13. Spatial disorientation trainer-flight simulator for use in demonstrating vestibular illusions comprising:
a cockpit;
a roll frame and pitch motor means mounted on the roll frame and direct drive coupled to the cockpit for rotating the cockpit about a pitch axis in response to a pitch speed command signal;
a yaw frame and roll motor means mounted on the yaw frame and direct drive coupled to the roll frame for rotating the cockpit about a roll axis in response to a roll speed command signal;
a planetary frame and yaw motor means mounted on a free end of the planetary frame and direct drive coupled to the yaw frame for rotating the cockpit about a yaw axis in response to a yaw speed command signal;
planetary motor means coupled to said planetary frame for rotating said cockpit about a planetary axis spaced from said pitch, roll and yaw axes in response to a planetary speed command signal;
pilot manipulable control means located on board said cockpit for generating pilot command signals;
operator control means located outboard said cockpit for generating operator command signals;
console computer means outboard the cockpit for generating console command signals in response to said operator command signals;
cockpit computer means having memory containing a motion control program onboard the cockpit for controlling motion of the cockpit about at least one of said pitch, roll and yaw axes by generating speed command signals based on said motion control program in response to said pilot command signals or said console command signals; and
means for interconnecting said cockpit and console computer means including a slip ring assembly located at at least one of said yaw and planetary axes.

14. Spatial disorientation trainer-flight simulator according to claim 13 wherein at least one of said pitch, roll and yaw motor means includes means for rotating the cockpit at a subthreshold speed in response to a subthreshold speed command signal to demonstrate a vestibular illusion and wherein at least one of said cockpit and console computer means includes means for generating said subthreshold speed command signal.

15. Spatial disorientation trainer-flight simulator according to claim 14 wherein said subthreshold speed is approximately 0.5°/sec–5°/sec.

16. Spatial disorientation trainer-flight simulator according to claim 13 wherein at least one of said pitch, roll and yaw motor means includes means for rotating the cockpit at speeds of approximately 200°/sec. and wherein at least one of said cockpit computer means and console computer means includes means for generating a speed command signal for operating said means for rotating the cockpit at approximately 200°/sec.

17. Spatial disorientation trainer-flight simulator according to claim 2, 3 or 13 wherein at least one of said cockpit and console computer means includes means for generating said planetary speed command signal in response to an operator command signal only.

18. Method of demonstrating spatial disorientation illusions, comprising:
gimbaling a cockpit for independent rotation about pitch, roll and yaw axes;
providing motor means for rotating said cockpit about each of said pitch, roll and yaw axes; and
causing said motor means to rotate said cockpit at a subthreshold speed about at least one of said pitch, roll and yaw axes and then stopping rotation of said cockpit to demonstrate a vestibular illusion.

19. Method according to claim 18 including gimbaling said cockpit such that said pitch axis is inside said roll axis and said roll axis is inside said yaw axis.

20. Method according to claim 19 including rotating said yaw axis in a circle around a planetary axis.

21. Spatial disorientation trainer-flight simulator, comprising:
a cockpit;
means for mounting the cockpit for independent rotation about pitch, roll and yaw axes;
motor means for rotating the cockpit at pitch, roll and yaw axes in response to speed command signals;
means for demonstrating a vestibular illusion including operator control means located at a console station for generating operator command signals and console computer means at said console station for generating console command signals in response to said operator command signals, pilot manipulable control means located at said cockpit for generating pilot command signals, and cockpit computer means having memory containing a motion control program onboard the cockpit for controlling motion of the cockpit about at least one of said pitch, roll and yaw axes by generating speed command signals based on said motion control program in response to said pilot command signals or said console command signals.

22. Spatial disorientation trainer-flight simulator according to claim 21 wherein said cockpit computer means and console computer means are interconnected by a slip ring assembly.

23. Spatial disorientation trainer-flight simulator according to claim 21 including means for mounting the cockpit for independent rotation about a planetary axis at a location spaced from said pitch, roll and yaw axes, planetary motor means for rotating the cockpit about the planetary axis, and means for interconnecting said cockpit and console computer means including a slip ring assembly located at at least one of said yaw axis and said planetary axis.

24. Spatial disorientation trainer-flight simulator according to claim 23 including tachometer means for generating a signal indicative of the speed of the planetary motor means, said console computer means including means connected to said tachometer means for generating a yaw speed command signal for said motor means if the signal generated by said tachometer means indicates that said planetary motor means has not stopped but not otherwise.

25. Spatial disorientation trainer-flight simulator according to claim 23 including emergency stop switch means, said computer means including means for determining a state of said emergency stop switch means and means for generating a speed command signal in response so as to bring said planetary motor means to a halt.

26. Spatial disorientation trainer-flight simulator according to claim 21 wherein at least one of said cockpit and console computer means includes means for adding a random factor to at least one of said speed command signals whereby said motor means rotates the cockpit in response to said at least one speed command signal to simulate flight turbulence.

27. Spatial disorientation trainer-flight simulator according to claim 21 wherein said motor means includes means for rotating the cockpit at least one of said pitch, roll and yaw axes at a subthreshold speed in response to a subthreshold speed command signal, and wherein at least one of said cockpit and console computer means includes means for generating said subthreshold speed command signal in response to at least one of said pilot and operator command signals.

28. Spatial disorientation trainer-flight simulator according to claim 27 wherein said subthreshold speed is approximately $0.5°/sec–5°1/sec$.

29. Spatial disorientation trainer-flight simulator according to claim 21 wherein said motor means includes means for rotating the cockpit about at least one of said pitch, roll and yaw axes at speeds of approximately $200°/sec$. to demonstrate aircraft flat spin and wherein at least one of said cockpit and console computer means includes means for generating the speed command signal for operating said means for rotating the cockpit at approximately $200°/sec$.

30. Spatial disorientation trainer-flight simulator according to claim 21 including manual control means for superseding said console computer means by generating said console command signals in response to said operator control means independently of said computer means.

31. Spatial disorientation trainer-flight simulator according to any of claims 1, 3, 13 and 21 wherein said operator control means comprises one or more joy sticks.

32. Spatial disorientation trainer-flight simulator according to any of claims 1, 3, 13 and 21 wherein said operator control means includes a programmed memory.

* * * * *